United States Patent US 11,445,406 B2
Mizukami et al. (45) Date of Patent: Sep. 13, 2022

(54) COMMUNICATION SYSTEM, COMMUNICATION CONTROL APPARATUS, NODE APPARATUS, AND COMMUNICATION METHOD FOR PERFORMING LOAD BALANCING IN A SYSTEM

(71) Applicant: NEC Corporation, Tokyo (JP)

(72) Inventors: Daisuke Mizukami, Tokyo (JP); Shinji Onishi, Tokyo (JP); Kazuhiro Egashira, Tokyo (JP); Shingo Shiga, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/082,526

(22) Filed: Oct. 28, 2020

(65) Prior Publication Data
US 2021/0105664 A1 Apr. 8, 2021

Related U.S. Application Data

(63) Continuation of application No. 15/556,912, filed as application No. PCT/JP2016/001219 on Mar. 7, 2016, now Pat. No. 10,863,382.

(30) Foreign Application Priority Data

Mar. 12, 2015 (JP) .................... 2015-049573

(51) Int. Cl.
H04W 72/00 (2009.01)
G08C 17/00 (2006.01)
(Continued)

(52) U.S. Cl.
CPC ........... *H04W 28/08* (2013.01); *H04W 8/065* (2013.01); *H04W 24/04* (2013.01); *H04W 92/14* (2013.01)

(58) Field of Classification Search
CPC ..... H04W 28/08; H04W 8/065; H04W 24/04; H04W 92/14
(Continued)

(56) References Cited

U.S. PATENT DOCUMENTS 5,402,470 A * 3/1995 DeVaney ............... H04W 92/14
455/422.1
2005/0227690 A1 10/2005 Noguchi et al.
(Continued)

FOREIGN PATENT DOCUMENTS

CN 101588325 A 11/2009
CN 101931935 A 12/2010
(Continued)

OTHER PUBLICATIONS

Partial European Search Report for EP Application No. 20199938.0 dated Jan. 26, 2021.
(Continued)

*Primary Examiner* — Mark G. Pannell
(74) *Attorney, Agent, or Firm* — Sughrue Mion, PLLC

(57) ABSTRACT

A communication system capable of dynamically changing an MME to serve in call processing in accordance with the load condition of the MMEs and the like is provided. A communication system of the present invention includes: communication control apparatuses (10) to (12); and a node apparatus (20) that executes call processing relating to a communication terminal with the communication control apparatuses (10) to (12). The communication control apparatuses (10) to (12) form a context sharing group that shares subscriber data of the communication terminal. The node apparatus (20) selects a first communication control apparatus in the context sharing group, and transmits a call processing message to the first communication control apparatus. The first communication control apparatus executes
(Continued)

the call processing using the subscriber data shared in the context sharing group.

19 Claims, 34 Drawing Sheets

(51) Int. Cl.
*H04W 28/08* (2009.01)
*H04W 8/06* (2009.01)
*H04W 24/04* (2009.01)
*H04W 92/14* (2009.01)

(58) Field of Classification Search
USPC .................................................. 455/452.1
See application file for complete search history.

(56) References Cited

U.S. PATENT DOCUMENTS

| | | | |
|---|---|---|---|
| 2009/0176496 A1* | 7/2009 | Li | H04L 47/767 455/437 |
| 2009/0213762 A1 | 8/2009 | Guo et al. | |
| 2010/0120399 A1 | 5/2010 | Guo et al. | |
| 2010/0167730 A1 | 7/2010 | Shin | |
| 2010/0311419 A1 | 12/2010 | Bi | |
| 2011/0122845 A1* | 5/2011 | Meirosu | H04L 67/14 370/332 |
| 2011/0165878 A1 | 7/2011 | Nylander et al. | |
| 2011/0312313 A1 | 12/2011 | Hiraga et al. | |
| 2013/0122922 A1 | 5/2013 | Cho et al. | |
| 2013/0136047 A1* | 5/2013 | Zhang | H04W 28/08 370/311 |
| 2013/0189951 A1 | 7/2013 | Lopez et al. | |
| 2014/0022996 A1* | 1/2014 | Punz | H04W 8/02 370/328 |
| 2014/0200019 A1 | 7/2014 | Nishina | |
| 2014/0308961 A1 | 10/2014 | Xu et al. | |
| 2014/0347990 A1 | 11/2014 | Chimbili et al. | |
| 2016/0021592 A1 | 1/2016 | Vesely et al. | |
| 2017/0188280 A1 | 6/2017 | Watfa et al. | |
| 2017/0311245 A1 | 10/2017 | Kuge et al. | |
| 2017/0374542 A1 | 12/2017 | Ryu et al. | |

FOREIGN PATENT DOCUMENTS

| | | |
|---|---|---|
| CN | 103096257 A | 5/2013 |
| CN | 103460786 A | 12/2013 |
| EP | 1510083 A1 | 3/2005 |
| EP | 1583388 A1 | 10/2005 |
| EP | 2398275 A1 | 12/2011 |
| EP | 1965597 B1 | 2/2014 |
| EP | 2739023 A1 | 6/2014 |
| JP | 2005-295234 A | 10/2005 |
| JP | 2012-004934 A | 1/2012 |
| JP | 2012-209861 A | 10/2012 |
| JP | 2013-511888 A | 4/2013 |
| JP | 2013-219835 A | 10/2013 |
| JP | 2013-239913 A | 11/2013 |
| JP | 2014-533011 A | 12/2014 |
| WO | WO-03/105502 A1 | 12/2003 |
| WO | 2010/003452 A1 | 1/2010 |
| WO | WO-2012/136812 A1 | 10/2012 |
| WO | WO-2013/014842 A1 | 1/2013 |
| WO | WO-2013/016842 A1 | 2/2013 |

OTHER PUBLICATIONS

NTT DOCOMO: "Introduce the Dedicated Core Network (DECOR) feature", 3GPP Draft; SA WGS Meeting #107, S2-150651, Jan. 30, 2015, Italy.
3GPP 3rd Generation Partnership Projection; Technical Specification Group Core Network and Terminals; Study of Evolved Packet Core (EPC) Nodes Restoration (Release 11), 3GPP TR 23.857 V11.0.0 (Dec. 2012), pp. 1-66.
3GPP TS 23.401 v13.1.0, 3rd Generation Partnership Project; Technical Specification Group Services and System Aspects; General Packet Radio Service (GPRS) Enhancements for Evolved Universal Terrestrial Radio Access Network (E-UTRAN) access (Release 13), 310 pp.
3GPP TSG-RAN WG3 Meeting #54, R3-061812, Siemens, Radio Access network Sharing for SAE/LTE, Riga, Latvia, Nov 6-10, Nov. 2006, Nov. 10, 2006, 3 pp.
China Notification of First Office Action issued in Chinese Patent Application No. 201680015367.8, dated Sep. 23, 2020, 17 pages.
Huawei Ritt China Mobile, "Requirement Clarification on Re-attachement under MME/UPE Pool Concept," 3GPP TSG SA WG2 Architecture—S2#56, S2-070077, Agenda Item 08.3, Florence, Italy, Jan. 15-19, 2007 (7 pages).
Huawei, "Discussion on NNSF Functionality," 3GPP TSG-RAN3 Meeting #61 bis, R3-082749, Agenda Item 10.2.8f, Prague, Czech Republic, Sep. 30-Oct. 3, 2008 (6 pages).
India Examination Report issued in Indian Patent Application No. 201717032641, dated Jun. 18, 2020, 6 pages.
International Search Report, Corresponding to PCT/JP2016/001219, dated May 24, 2016, 2 pages.
Japanese Notice of Reasons for Refusal issued in Japanese Patent Application No. 2017-504863, dated Aug. 25, 2020, 4 pages.
Japanese Notice of Reasons for Refusal issued in Japanese Patent Application No. 2017-504863, dated Jun. 2, 2020, 10 pages.
Partial Supplementary European Search Report issued by the European Patent Office for European Application No. 16761296.9 dated Oct. 1, 2018 (18 pages).
RCR Wireless New, GUTI—understanding the unique ID in LTE, May 9, 2014, www.https://www.rcrwireless.com/20140509/wireless<http://www.rcrwireless.com/20140509/wireless>/guti-explained-the-unique-id-in-lte.
ZTE "Discussion on Inter-3GPP Handover based on Proxy-MIP," 3GPP TSG SA WG2 Architecture—S2#SAEAdHoc, S2H060458, Agenda Item 3.1, Paris, France, Apr. 3-6, 2006 (9 pages).
Japanese Office Action for JP Application No. 2020-215053 dated Mar. 1, 2022 with English Translation.

* cited by examiner

| CONTEXT SHARING GROUP | MME | WF |
|---|---|---|
| GROUP A | 30 | 50 |
|  | 40 | 40 |
|  | ⋮ | ⋮ |
|  | N | 45 |
| GROUP B | 50 | 10 |
|  | 60 | 90 |

Fig. 18

COMMUNICATION SYSTEM, COMMUNICATION CONTROL APPARATUS, NODE APPARATUS, AND COMMUNICATION METHOD FOR PERFORMING LOAD BALANCING IN A SYSTEM

CROSS-REFERENCE TO RELATED APPLICATIONS

The present application is a continuation of U.S. patent application Ser. No. 15/556,912, entitled "Methods and Systems for Balancing Load among Communication Control Apparatuses," filed Sep. 8, 2017, which is a national stage application of International Application No. PCT/JP2016/001219 entitled "Communication System, Communication Control Device, Node Device and Communication Method," filed on Mar. 7, 2016, which claims the benefit of priority from Japanese Patent Application No. 2015-049573, filed on Mar. 12, 2015, the disclosures of which are incorporated herein in their entirety by reference thereto.

TECHNICAL FIELD

The present invention relates to communication systems and, particularly, to a communication system that selects a communication control apparatus out of a plurality of communication control apparatuses.

BACKGROUND ART

The proliferation of smartphones and tablet terminals makes it necessary for MMEs (Mobile Management Entities) disposed in a core network to handle a vast variety of kinds of signaling generated by applications on these devices. Further, the characteristic of signaling greatly changes and unexpectable signaling increases depending on the time or place where communications are established; for example, in providing MTC (Machine Type Communication) services, in holding any events with crowds, or in disaster situations. To withstand such an environment, mobile communication providers must maintain service quality while avoiding an excessive investment and reducing TCO (Total Cost Ownership).

Accordingly, what is demanded of MMEs is a mechanism that achieves dynamic load balancing in relation to signaling in accordance with the performance of the apparatuses, available resources, load conditions or the like. For example, Non Patent Literature 1 discloses a scheme of signaling control at MMEs. Further, Patent Literature 1 discloses load balancing in order to avoid congestion at an MME by migrating service responsibilities to another MME on an eNB (evolved NodeB)-by-eNB basis.

CITATION LIST

Patent Literature

Patent Literature 1: Published Japanese Translation of PCT International Publication for Patent Application No. 2014-533011

Non Patent Literature

Non Patent Literature 1: 3GPP TS 23.401 V13.1.0 (2014 December) 5.3.2 Attach procedure

SUMMARY OF INVENTION

Technical Problem

Here, Non Patent Literature 1 discloses that, when information necessary in call processing, such as MM Context (subscriber data) relating to a communication terminal, is once generated at a specific MME, in performing call processing relating to that communication terminal, the MME where the information necessary in call processing was generated continues to be used. Accordingly, unfortunately, Non Patent Literature 1 fails to dynamically change the MME to serve in call processing in accordance with the load condition of the MMEs or the like. Further, Patent Literature 1 may fail to fully or properly achieve load balancing among MMEs because of its migrating service responsibilities on an eNB-by-eNB basis.

An object of the present invention is to solve the problems described above, and to provide a communication system, a communication control apparatus, a node apparatus, and a communication method capable of more effectively achieving load balancing among MMEs.

Solution to Problem

A communication system according to a first aspect of the present invention includes: a plurality of communication control apparatuses; and a node apparatus that executes control processing including call processing relating to a communication terminal with the plurality of communication control apparatuses. The plurality of communication control apparatuses form a context sharing group that shares subscriber data of the communication terminal. The node apparatus selects a first communication control apparatus in the context sharing group, and transmits a call processing message to the first communication control apparatus. The first communication control apparatus executes the call processing using the subscriber data shared in the context sharing group.

A communication control apparatus according to a second aspect of the present invention includes a context sharing unit that shares subscriber data of a communication terminal with other communication control apparatus belonging to a context sharing group, wherein, upon receipt of a call processing message from a node apparatus, the communication control apparatus executes call processing using the subscriber data shared in the context sharing group.

A node apparatus according to a third aspect of the present invention executes, with a communication control apparatus, control processing including call processing relating to a communication terminal, wherein every time the node apparatus transmits a call processing message, the node apparatus selects a communication control apparatus out of a plurality of communication control apparatuses belonging to a context sharing group sharing subscriber data of the communication terminal, and transmits a control processing message including the call processing message to the selected communication control apparatus.

A communication method according to a fourth aspect of the present invention is a communication method executed in a communication system that includes a plurality of communication control apparatuses and a node apparatus that executes control processing including call processing relating to a communication terminal with the plurality of communication control apparatuses. The plurality of communication control apparatuses form a context sharing group that shares subscriber data of the communication terminal.

The node apparatus selects a first communication control apparatus in the context sharing group. The node apparatus transmits a call processing message to the selected first communication control apparatus. The first communication control apparatus executes the call processing using the subscriber data shared in the context sharing group.

Advantageous Effects of Invention

The present invention provides a communication system, a communication control apparatus, a node apparatus, and a communication method capable of more effectively achieving load balancing on MMEs in accordance with the load condition of the MMEs or the like.

BRIEF DESCRIPTION OF THE DRAWINGS

FIG. 18 shows management information managed by the eNB, the S-GW, and the HSS according to the second embodiment.

DESCRIPTION OF EMBODIMENTS

First Embodiment

Figure 1:
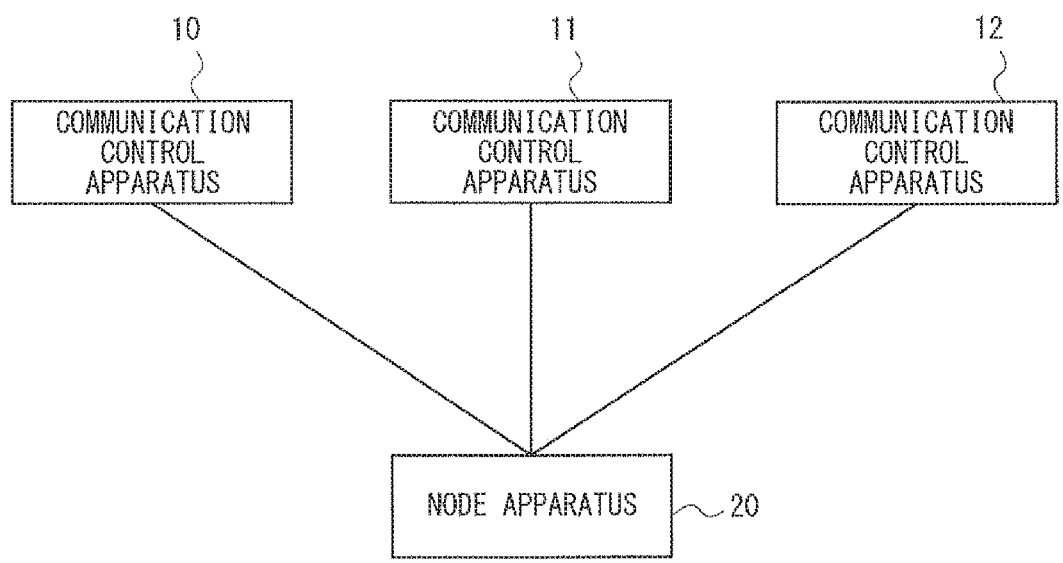
FIG. 1 shows a configuration of a communication system according to a first embodiment.

In the following, with reference to the drawings, a description will be given of embodiments of the present invention. Firstly, with reference to FIG. 1, a description will be given of an exemplary configuration of a communication system according to a first embodiment of the present invention. The communication system shown in FIG. 1 includes communication control apparatuses 10 to 12 and a node apparatus 20. While FIG. 1 shows that the node apparatus 20 is connected to the communication control apparatuses 10 to 12, the node apparatus 20 may be connected to two or more than three communication control apparatuses.

The communication control apparatuses 10 to 12 may each be a computer apparatus which operates by a CPU (Central Processing Unit) executing a program stored in memory. Further, the communication control apparatuses 10 to 12 may be MMEs or SGSNs (Serving GPRS Support Nodes) defined in the 3GPP (the 3rd Generation Partnership Project).

The node apparatus 20 executes, with the communication control apparatuses 10 to 12, control processing including call processing relating to a communication terminal. The call processing corresponds to, for example, control processing such as route configuration in a core network that is executed when a communication terminal establishes a voice call or data communications or the like. The node apparatus 20 may be a computer apparatus that operates by a CPU (Central Processing Unit) executing a program stored in memory. Further, the node apparatus 20 may be an eNB (evolved Node B), an RNC (Radio Network Controller), an S-GW (Serving Gateway), an HSS (Home Subscriber Server) or the like defined in the 3GPP.

The communication terminal may be, for example, a mobile phone, a smartphone, or a tablet terminal having a communication function. Further, the communication terminal may be a computer apparatus such as a personal computer.

The communication control apparatuses 10 to 12 form a context sharing group that shares subscriber data of the communication terminal. The communication control apparatuses 10 to 12 sharing the subscriber data means that any subscriber data available to the communication control apparatus 10 is also available to the communication control apparatuses 11 and 12. For example, when there is a server apparatus that manages the subscriber data, the communication control apparatuses 10 to 12 may retrieve subscriber data as appropriate from the server apparatus. Alternatively, the communication control apparatuses may transmit and receive subscriber data between each other, thereby acquiring subscriber data retained by another communication control apparatus.

When the node apparatus 20 executes call processing or control processing relating to a communication terminal, the node apparatus 20 selects any communication control apparatus in the context sharing group. Further, the node apparatus 20 transmits, to the selected communication control apparatus, a call processing message or a control message. The call processing message may be, for example, a control message defined in the 3GPP. The 3GPP defines various control messages, for example, an Attach Request message that is transmitted when the power of the communication terminal transits to the ON state. The node apparatus selects one communication control apparatus based on information which it has been notified about by the communication control apparatuses (e.g., the congestion status of each of the communication control apparatuses, the capacity of each of the communication control apparatuses, information on the subscriber data shared among the communication control apparatuses (the context sharing group)).

The communication control apparatus selected by the node apparatus 20, that is, the communication control apparatus which has received the call processing message or the control message transmitted by the node apparatus 20, executes call processing or control processing using the subscriber data shared among the communication control apparatuses belonging to the context sharing group. For example, when the communication control apparatus selected by the node apparatus 20 retains therein the subscriber data of the communication terminal which is the call processing-target, the communication control apparatus executes call processing or control processing using the retained subscriber data. When the communication control apparatus selected by the node apparatus 20 does not retain therein the subscriber data of the communication terminal which is the call processing-target, the communication control apparatus may retrieve the subscriber data managed by the server apparatus, or retrieve the subscriber data from another communication control apparatus.

As has been described above, with the communication system in FIG. 1, the communication control apparatuses belonging to the context sharing group can share the subscriber data of the communication terminal. Accordingly, the node apparatus can execute call processing or control processing of a communication terminal with any selected one of the communication control apparatuses belonging to the context sharing group.

Thus, the node apparatus 20 can dynamically change the communication control apparatus to serve in communication in executing call processing or control processing. Accordingly, the node apparatus 20 can change the communication control apparatus, for example, depending on the load condition of the communication control apparatuses. As a result, the node apparatus 20 can exert load balancing control among the plurality of communication control apparatuses. Further, the node apparatus can distribute, on a subscriber-by-subscriber basis, call processing messages or control messages over the communication control apparatus sharing the subscriber data. Accordingly, as compared to the case where messages are distributed on a node apparatus-by-node apparatus basis, the above node apparatus can distribute messages more properly by finer division among the communication control apparatuses.

Second Embodiment

Figure 2:
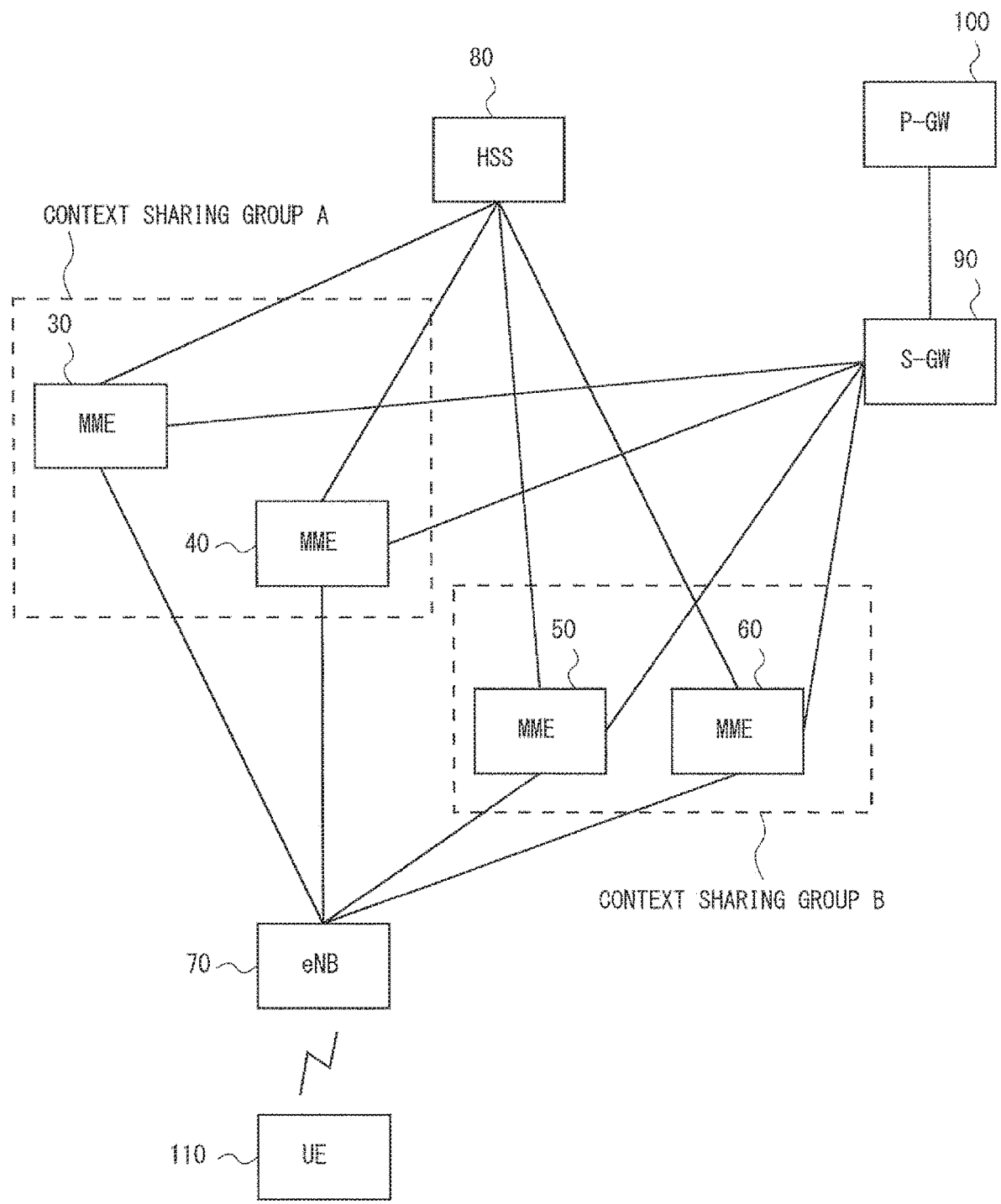
FIG. 2 shows a configuration of a communication system according to a second embodiment.

In the following, with reference to FIG. 2, a description will be given of an exemplary configuration of a communication system according to a second embodiment of the present invention. The communication system in FIG. 2 is configured by the apparatuses defined in the 3GPP. The communication system in FIG. 2 includes MMEs 30 to 60, an eNB 70, an HSS 80, an S-GW 90, a P-GW (Packet Data Network-Gateway) 100, and an UE (User Equipment) 110. The MMEs 30 to 60 correspond to the communication control apparatuses in FIG. 1. The eNB 70, the HSS 80, and the S-GW 90 correspond to the node apparatus in FIG. 1. The UE 110 corresponds to the communication terminal.

Further, the MMEs may be replaced by SGSNs defined in the 3GPP, and the eNB may be replaced by an RNC defined in the 3GPP.

In FIG. 2, the MME 30 and the MME 40 belong to a context sharing group A, and the MME 50 and the MME 60 belong to a context sharing group B. Further, the MMEs 30 to 60 may belong to an MME group which is not a context sharing group. The MME group is formed by MMEs which are candidates for the first MME at which the eNB 70 generates context information. The context information corresponds to the subscriber data described with reference to FIG. 1. That is, the MME group may include a plurality of context sharing groups. Alternatively, the MMEs belonging to the MME group and the MMEs belonging to the context sharing group may be identical to each other.

In general, when the eNB 70 determines to generate context information relating to the UE 110 firstly at the MME 30, the eNB 70 selects the MME 30 in every following step in the call processing. In contrast, in the embodiments of the present invention, even if the eNB 70 firstly generates context information at the MME 30, the eNB 70 can select the MME 30 or the MME 40 in any later step in the call processing. Further, the HSS 80 and the S-GW 90 are also capable of executing call processing by selecting an MME which is different from the MME at which the context information was firstly generated.

Figure 3:
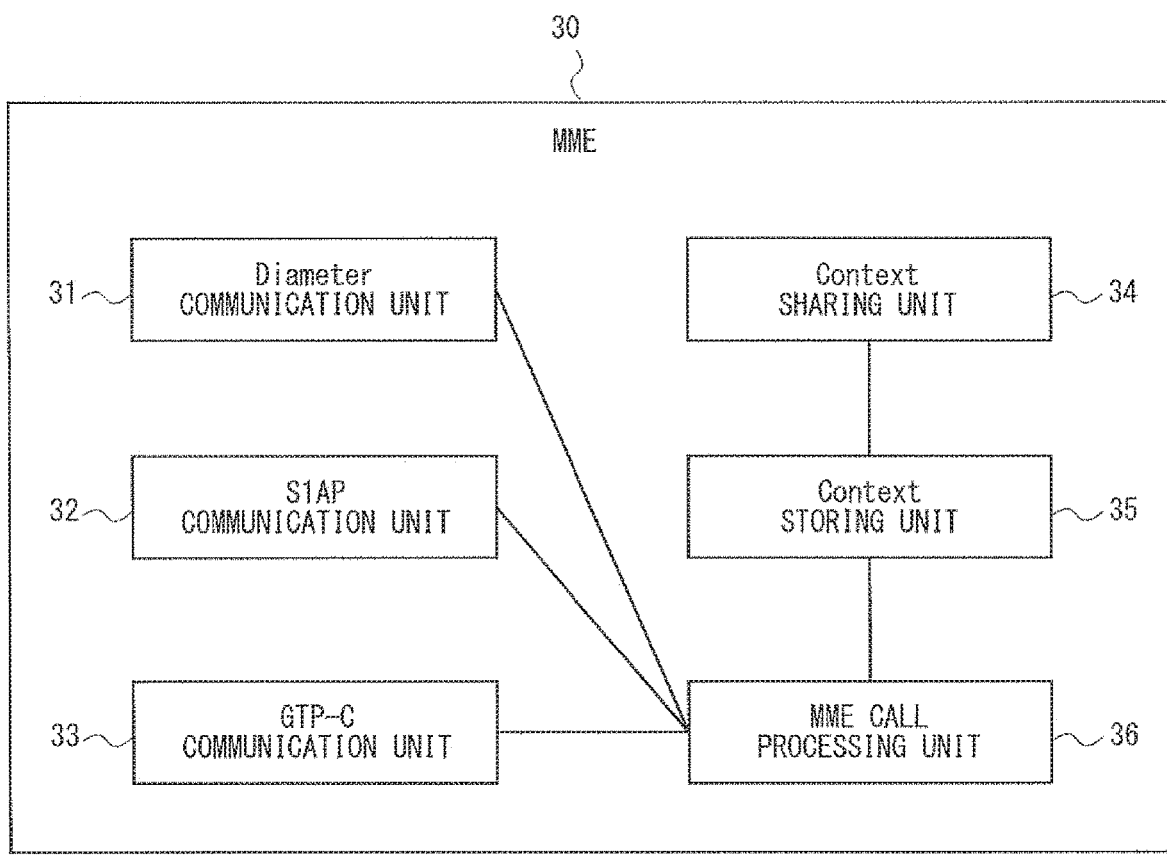
FIG. 3 shows a configuration of an MME according to the second embodiment.

In the following, with reference to FIG. 3, a description will be given of an exemplary configuration of the MME 30 according to the second embodiment of the present invention. The MMEs 40 to 60 are substantially configured identically to the MME 30 and, therefore, a detailed description thereof will not be repeated.

The MME 30 includes a Diameter communication unit 31, an S1AP (S1 Application) communication unit 32, a GTP (General packet radio service Tunneling Protocol)-C communication unit 33, a context sharing unit 34, a context storing unit 35, and an MME call processing unit 36. The Diameter communication unit 31 is used as the interface between the MME 30 and the HSS 80. The S1AP communication unit 32 is used as the interface between the MME 30 and the eNB 70. The GTP-C communication unit 33 is used as the interface between the MME 30 and the S-GW 90.

The context sharing unit 34 retrieves the context information of the UE 110 being the target of the call processing. For example, when the server apparatus or the like manages the context information generated at an MME belonging to the context sharing group A, the context sharing unit 34 may retrieve the context information of the call processing-target UE 110 from the server apparatus. Alternatively, the context sharing unit 34 may retrieve the context information of the call processing-target UE 110 from the MME 40 belonging to the context sharing group A.

The context storing unit 35 stores the context information retrieved by the context sharing unit 34 and the context information generated by the MME 30. The context storing unit 35 may be, for example, memory inside the MME 30, or may be an external memory apparatus or the like attached to the MME 30. Alternatively, the context information may be shared by a plurality of MMEs by the HSS 80 retaining the context information and the plurality of MMEs making access to the HSS 80 as necessary.

Further, the context storing unit 35 retains information on the context sharing group to which the MME 30 belongs. Here, the context storing unit 35 retains information representing the context sharing group A. The context storing unit 35 may be, for example, memory inside the MME 30, or an external memory apparatus or the like attached to the MME 30. Alternatively, the information retained by the context storing unit 35 may be shared by a plurality of MMEs by the HSS 80 retaining the context storing unit 35 and the plurality of MMEs making access to the HSS 80 as necessary.

The MME call processing unit 36 executes call processing using the context information and the information representing the context sharing group A stored in the context storing unit 35. The MME call processing unit 36 transmits and receives messages relating to call processing with the eNB 70, the HSS 80, or the S-GW 90, via the Diameter communication unit 31, the S1AP communication unit 32, or the GTP-C communication unit 33.

Figure 4:
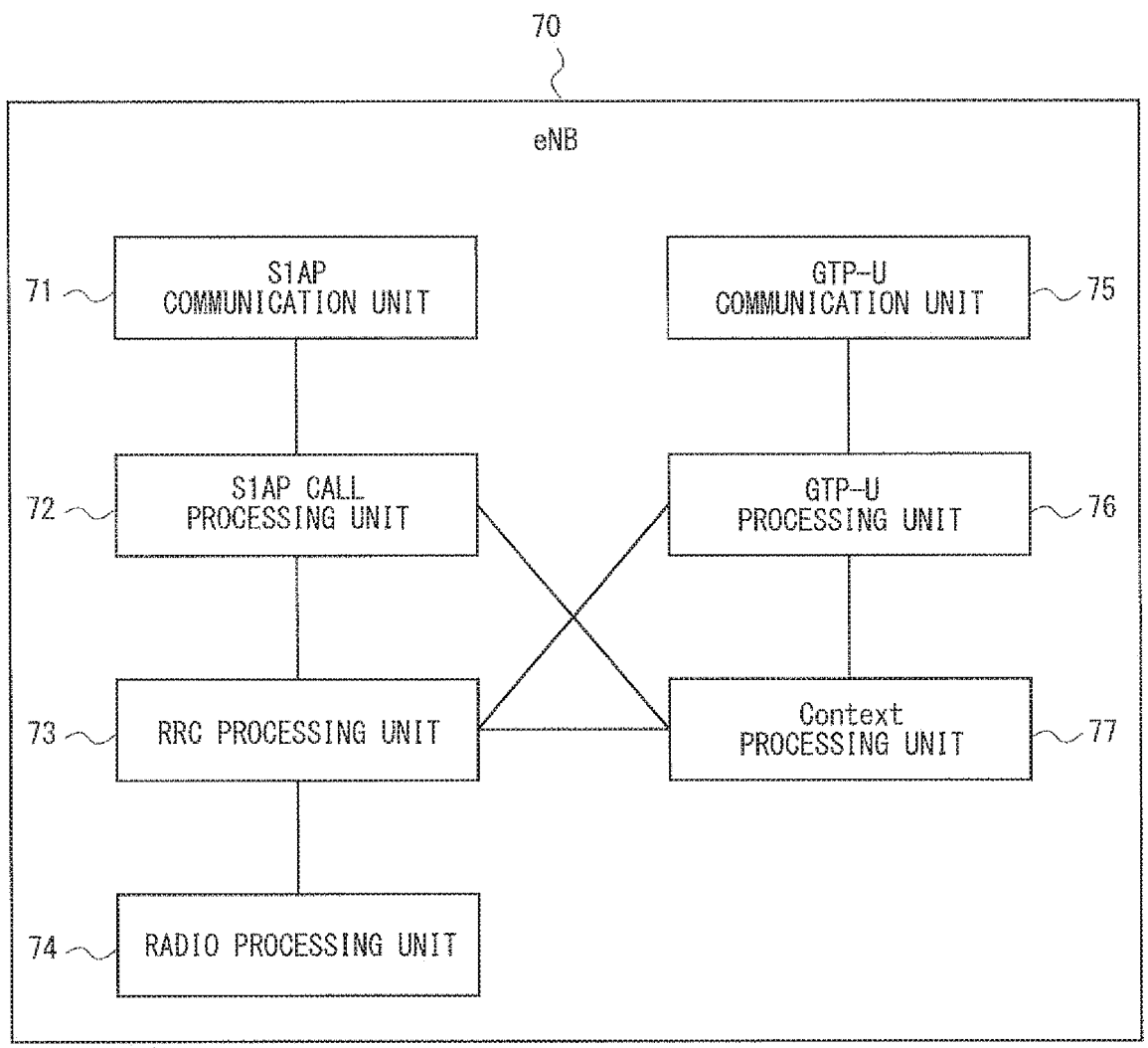
FIG. 4 shows a configuration of an eNB according to the second embodiment.

In the following, with reference to FIG. 4, a description will be given of an exemplary configuration of the eNB 70 according to the second embodiment of the present invention. The eNB 70 includes an S1AP communication unit 71, an S1AP call processing unit 72, an RRC (Radio Resource Control) processing unit 73, a radio processing unit 74, a GTP-U communication unit 75, a GTP-U processing unit 76, and a context storing unit 77.

The S1AP communication unit 71 is used as the interface in communicating with the MMEs 30 to 60. The S1AP call processing unit 72 executes call processing between the eNB 70 and the MMEs 30 to 60 using information stored in the context storing unit 77.

The S1AP call processing unit 72 transmits and receives messages relating to call processing between the eNB 70 and the MMEs 30 to 60 via the S1AP communication unit 71. Further, the S1AP call processing unit 72 selects, using information stored in the context storing unit 77, an MME with which the call processing is executed.

The RRC (Radio Resource Control) processing unit 73 executes a process relating to the RRC protocol used with the UE 110. For example, the RRC processing unit 73 may execute a process of managing the connection state relative to the UE 110. The radio processing unit 74 is used as the interface in wirelessly communicating with the UE 110.

The GTP-U communication unit 75 is used as the interface in communicating with the S-GW 90. The GTP-U processing unit 76 transmits and receives user data with the S-GW 90 via the GTP-U communication unit 75.

The context storing unit 77 stores information on the context sharing group received from the MMEs 30 to 60. For example, the context storing unit 77 stores the context sharing group and the MMEs belonging to the group in association with each other. Further, the context storing unit 77 may store a WF (Weight Factor) which is referred to in selecting the MMEs, in association with the MMEs.

Figure 5:
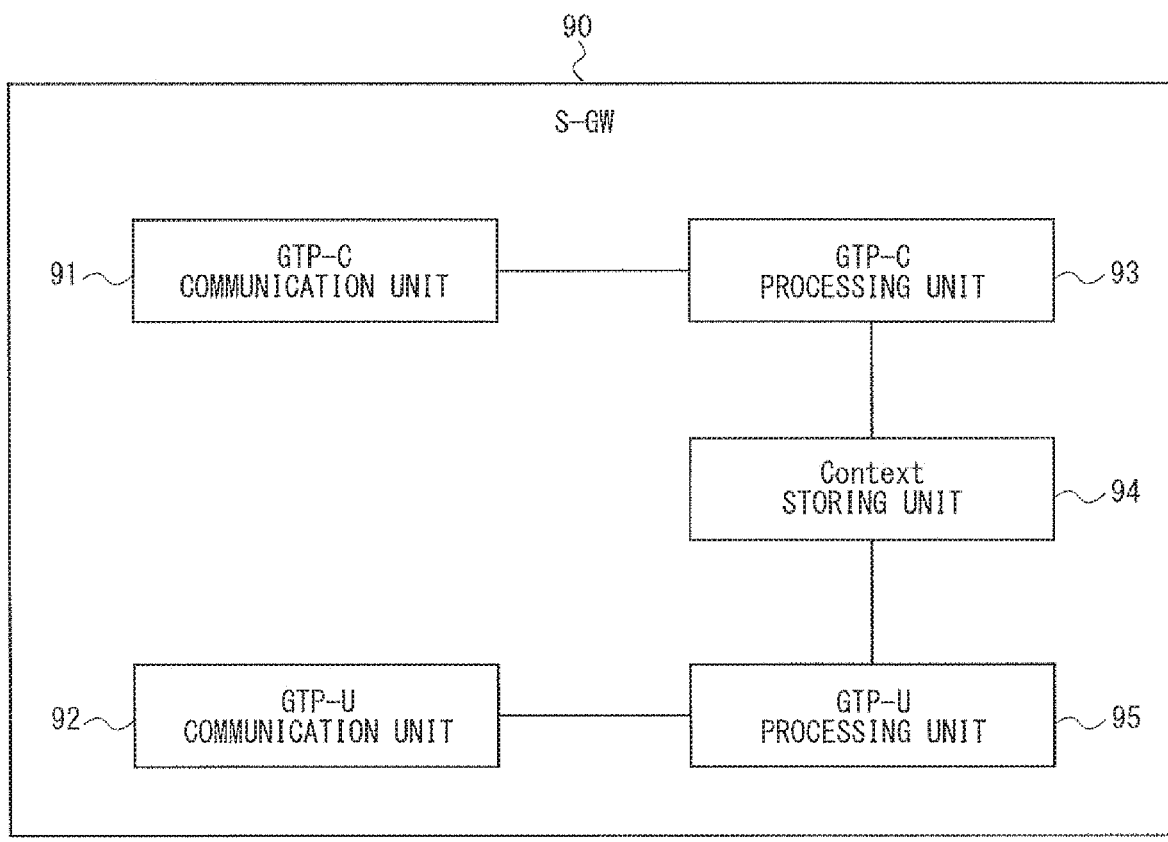
FIG. 5 shows a configuration of an S-GW according to the second embodiment.

In the following, with reference to FIG. 5, a description will be given of an exemplary configuration of the S-GW 90 according to the second embodiment of the present invention. The S-GW 90 includes a GTP-C communication unit 91, a GTP-U communication unit 92, a GTP-C processing unit 93, a context storing unit 94, and a GTP-U processing unit 95.

The GTP-C communication unit 91 is used as the interface in communicating with the MMEs 30 to 60. The GTP-U communication unit 92 is used as the interface in communicating with the eNB 70.

The GTP-C processing unit 93 transmits and receives messages relating to call processing between the S-GW 90 and the MMEs 30 to 60 via the GTP-C communication unit 91. Further, the GTP-C processing unit 93 selects, using information stored in the context storing unit 94, an MME with which the call processing is executed. The GTP-U processing unit 95 transmits and receives user data with the eNB 70 via the GTP-U communication unit 92.

The context storing unit 94 stores information on the context sharing group received from the MMEs 30 to 60. For example, the context storing unit 77 stores the context sharing group and the MMEs belonging to the group in association with each other. Further, the context storing unit 94 may store the WF which is referred to in selecting the MMEs, in association with the MMEs.

Figure 6:
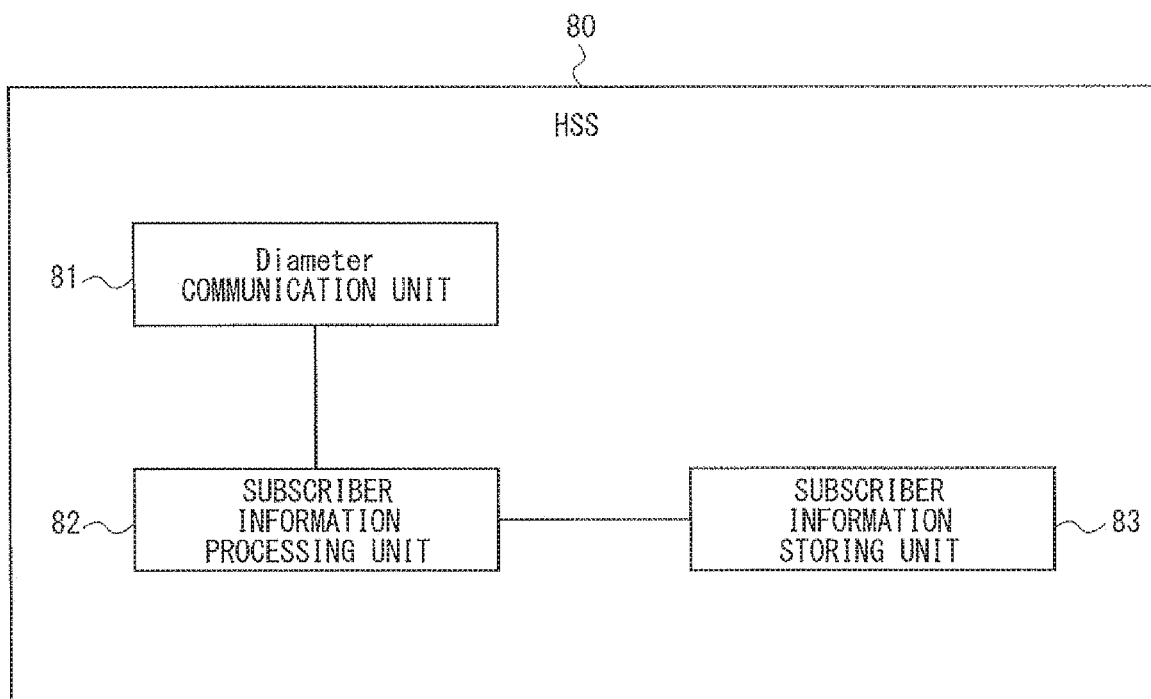
FIG. 6 shows a configuration of an HSS according to the second embodiment.

In the following, with reference to FIG. 6, a description will be given of an exemplary configuration of the HSS 80 according to the second embodiment of the present invention. The HSS 80 includes a Diameter communication unit 81, a subscriber information processing unit 82, and a subscriber information storing unit 83. The Diameter communication unit 81 is used as the interface in communicating with the MMEs 30 to 60.

The subscriber information storing unit 83 stores information on the context sharing group received from the MMEs 30 to 60. For example, the subscriber information storing unit 83 stores the context sharing group and the MMEs belonging to the group in association with each other.

Further, the subscriber information storing unit 83 may store the WF which is referred to in selecting the MMEs, in association with the MMEs.

The subscriber information processing unit 82 transmits and receives messages relating to call processing between the HSS 80 and the MMEs 30 to 60 via the Diameter communication unit 81. Further, the subscriber information processing unit 82 selects, using information stored in the subscriber information storing unit 83, an MME with which the call processing is executed.

In the following, with reference to FIG. 7, a description will be given of a processing flow of notifying information on the context sharing group from the MMEs to the eNB according to the second embodiment of the present invention. Firstly, the eNB 70 transmits an S1 SETUP REQUEST message to every MME in the MME group in order to establish an S1 connection (S11).

Next, as a response to the S1 SETUP REQUEST message, the MMEs each transmit an S1 SETUP RESPONSE message to the eNB 70 (S12). Each of the MMEs set, on its S1 SETUP RESPONSE message, the context sharing group to which the MME belongs, a GUMMEI (Globally Unique MME Identifier), and a WF (Weight Factor). The GUMMEI is identification information for uniquely identifying each of the MMEs. The WF is priority information that the eNB 70 uses in selecting an MME with which call processing is executed. For example, the eNB 70 may frequently select an MME with a higher WF value, and less frequently select an MME with a lower WF value. The eNB 70 retains the information set on the S1 SETUP RESPONSE message.

In the following, with reference to FIG. 8, a description will be given of a processing flow, which is different from that shown in FIG. 7, of notifying information on the context sharing group according to the second embodiment of the present invention. Firstly, the MME 30 and the MME 40 undergo a representative selecting process of determining which one of the MME 30 and the MME 40 is the representative MME (S20). The representative selecting process is executed among a plurality of MMEs belonging to an identical context sharing group. For example, as the representative MME, the MME with lower-number identification information may be selected. The representative MME may be selected based on other criterion. Here, it is assumed that the MME 30 is selected as the representative MME. Further, in the representative selecting process, the MME 40 and others which are not the representative MME may transmit their own information such as the GUMMEI and the WF to the representative MME.

Next, the eNB 70 transmits an S1 SETUP REQUEST message to every MME in the MME group in order to establish an S1 connection (S21). Note that, while FIG. 8 shows that the eNB 70 transmits the S1 SETUP REQUEST message to the MME 30 and the MME 40, it is to be understood that the eNB 70 transmits the S1 SETUP REQUEST message to every MME in the MME group.

Next, the MME 30 being the representative MME transmits, to the eNB 70, an S1 SETUP RESPONSE message, setting thereon the context sharing group, the GUMMEI of every MME belonging to the context sharing group, and the WF of every MME (S22). The MME 40 not being the representative MME transmits an S1 SETUP RESPONSE message to the eNB 70 in order to establish an S1 connection. On the S1 SETUP RESPONSE message transmitted by the MME 40, information on the context sharing group may not be set.

In the following, with reference to FIG. 9, a description will be given of a processing flow, which is different from those shown in FIGS. 7 and 8, of notifying information on the context sharing group according to the second embodiment of the present invention. In FIG. 9, an EMS (Element Management System) apparatus registers, on the eNB 70, information on the context sharing group, the GUMMEI of every MME belonging to the context sharing group, and the WF of every MME (S31).

Figure 10:
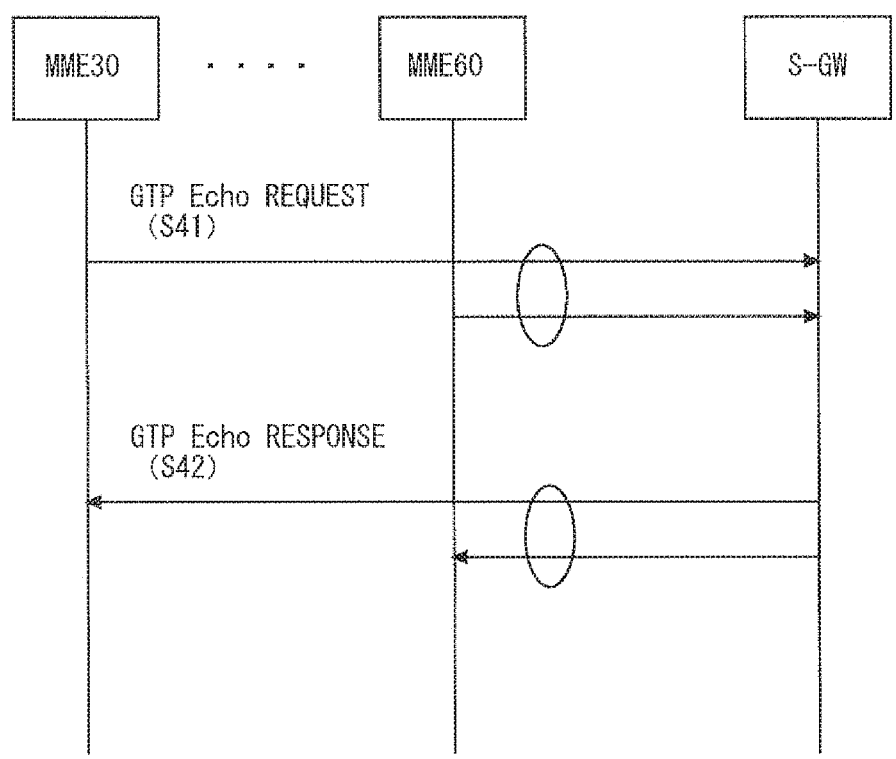
FIG. 10 shows a processing flow of notifying information on the context sharing group from the MME to the S-GW according to the second embodiment.

In the following, with reference to FIG. 10, a description will be given of a processing flow of notifying information on the context sharing group from the MMEs to the S-GW according to the second embodiment of the present invention. Firstly, each of the MMEs transmits a GTP Echo REQUEST message to the S-GW 90, setting thereon the context sharing group to which the MME belongs and the WF (S41). The S-GW 90 identifies each MME using the IP address of the sender of the GTP Echo REQUEST message. The S-GW 90 retains the information set on the GTP Echo REQUEST message.

Next, the S-GW 90 transmits a GTP Echo RESPONSE message to each of the MMEs (S42). In general, the GTP Echo REQUEST message and the GTP Echo RESPONSE message are used for determining whether or not any failure is occurring between the MMEs and the S-GW.

Figure 11:
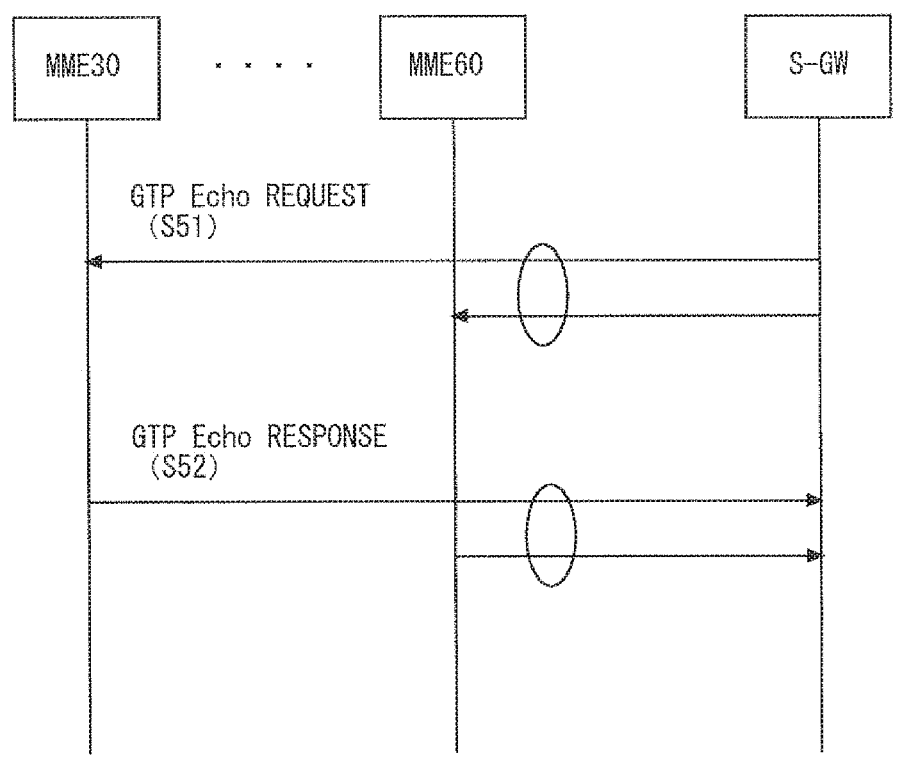
FIG. 11 shows a processing flow of notifying information on the context sharing group from the MME to the S-GW according to the second embodiment.

In the following, with reference to FIG. 11, a description will be given of a processing flow, which is different from that shown in FIG. 10, of notifying information on the context sharing group according to the second embodiment of the present invention. In FIG. 11, the S-GW 90 transmits a GTP Echo REQUEST message to each of the MMEs (S51). Next, each of the MMEs transmits a GTP Echo RESPONSE message to the S-GW 90, setting thereon the context sharing group to which the MME belongs and the WF (S52).

Figure 12:
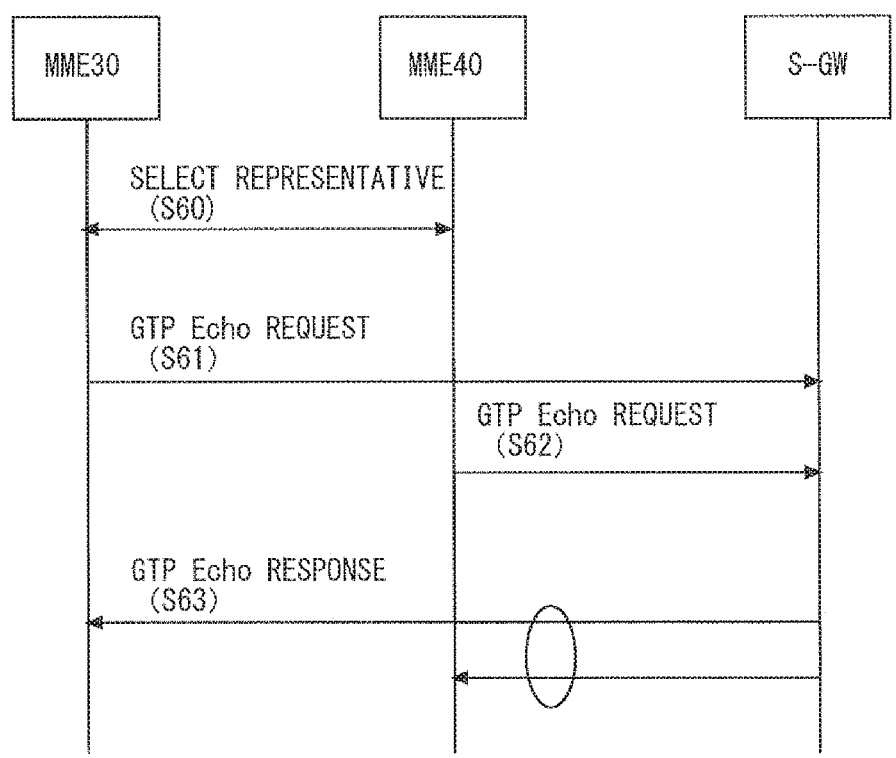
FIG. 12 shows a processing flow of notifying information on the context sharing group from the MME to the S-GW according to the second embodiment.

In the following, with reference to FIG. 12, a description will be given of a processing flow, which is different from those shown in FIGS. 10 and 11, of notifying information on the context sharing group information according to the second embodiment of the present invention.

Firstly, the MME 30 and the MME 40 undergo a representative selecting process of determining which one of the MME 30 and the MME 40 is the representative MME (S60). The representative selecting process is executed among a plurality of MMEs belonging to an identical context sharing group. Here, it is assumed that the MME 30 is selected as the representative MME.

Next, the MME 30 being the representative MME transmits a GTP Echo REQUEST message to the S-GW 90, setting thereon the context sharing group and the WF of every MME belonging to the context sharing group (S61). The MME 30 may set the IP address being the identification information of each MME belonging to the context sharing group and the WF in association with each other. The MME 40 not being the representative MME transmits a normal GTP Echo REQUEST message to the S-GW 90 (S62).

Next, as a response message to the GTP Echo REQUEST message, the S-GW 90 transmits a GTP Echo RESPONSE message to each of the MMEs (S63).

Figure 13:
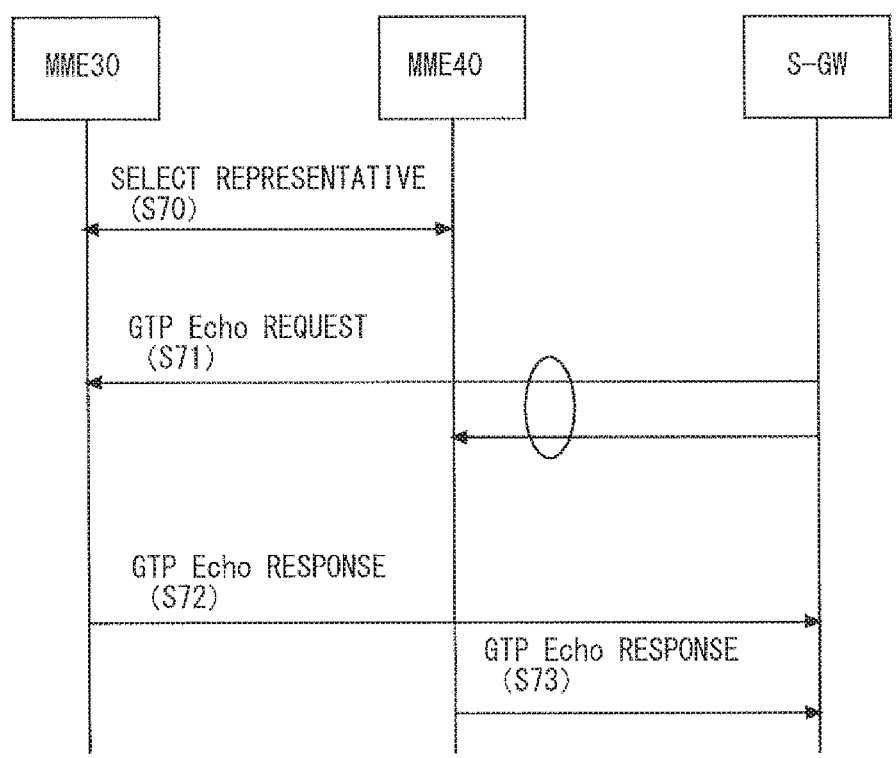
FIG. 13 shows a processing flow of notifying information on the context sharing group from the MME to the S-GW according to the second embodiment.

In the following, with reference to FIG. 13, a description will be given of a processing flow, which is different from those shown in FIGS. 10 to 12, of notifying context sharing group information according to the second embodiment of the present invention. Firstly, similarly to step S60 in FIG. 12, the MME 30 and the MME 40 undergo the representative selecting process (S70). Next, the S-GW 90 transmits a GTP Echo REQUEST message to every MME in the MME group (S71).

Next, as a response message to the GTP Echo REQUEST message, the MME 30 being the representative MME transmits a GTP Echo REQUEST message to the S-GW 90, setting thereon the context sharing group and the WF of every MME belonging to the context sharing group (S72).

As a response message to the GTP Echo REQUEST message, the MME 40 not being the representative MME transmits a normal GTP Echo RESPONSE message to the S-GW 90 (S73).

Figure 14:
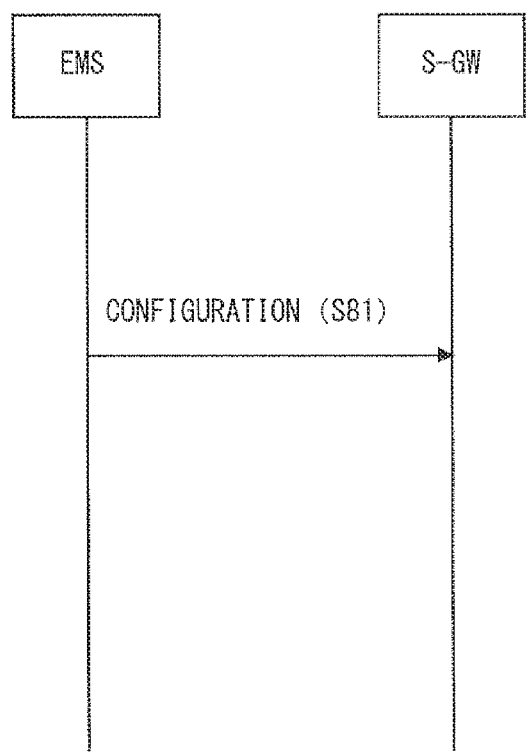
FIG. 14 shows a processing flow of notifying information on the context sharing group from the MME to the S-GW according to the second embodiment.

In the following, with reference to FIG. 14, a description will be given of a processing flow, which is different from those shown in FIGS. 10 to 13, of notifying context sharing group information according to the second embodiment of the present invention. In FIG. 14, the EMS (Element Management System) apparatus registers, on the S-GW 90, information on the context sharing group and the WF of every MME belonging to the context sharing group (S81).

Figure 15:
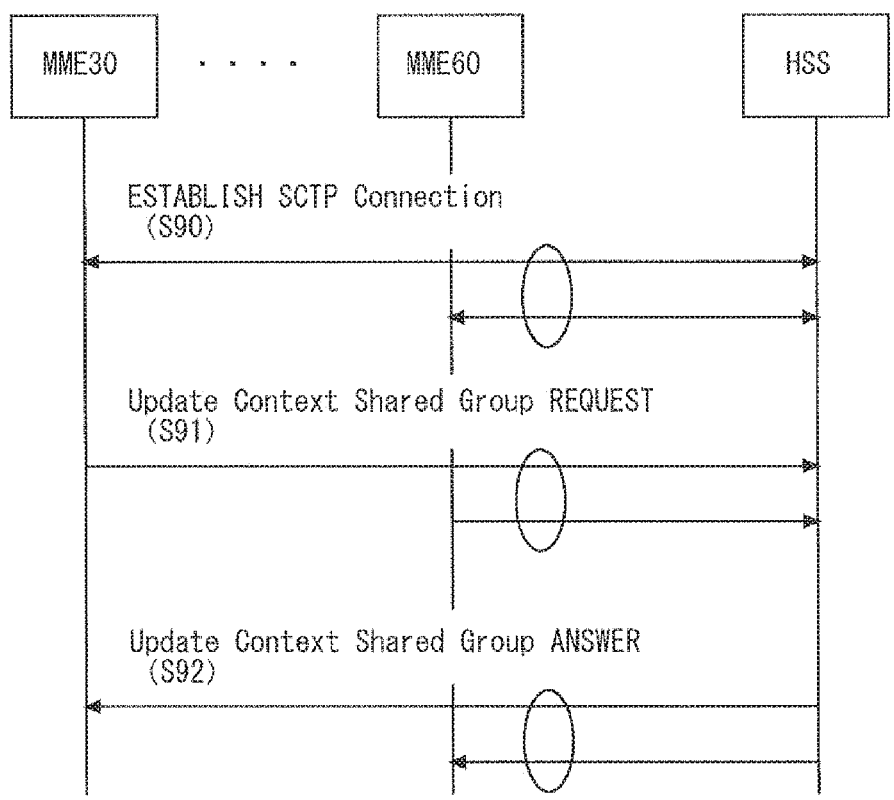
FIG. 15 shows a flow of notifying information on the context sharing group from the MME to the HSS according to the second embodiment.

In the following, with reference to FIG. 15, a description will be given of a processing flow of notifying context sharing group information from the MMEs to the HSS 80 according to the second embodiment of the present invention. Firstly, the MMEs each establish an SCTP (Stream Control Transmission Protocol) Connection with the HSS 80 (S90).

Next, the MMEs each transmit, to the HSS 80, an Update Context Shared Group REQUEST message, setting thereon the context sharing group to which the MME belong, an Origin-Host, and the WF (S91). The Origin-Host is information that identifies the MMEs. The HSS 80 retains the information set on the Update Context Shared Group REQUEST message.

Next, as a response to the Update Context Shared Group REQUEST message, the HSS 80 transmits an Update Context Shared Group ANSWER message to each of the MMEs (S92).

Figure 16:
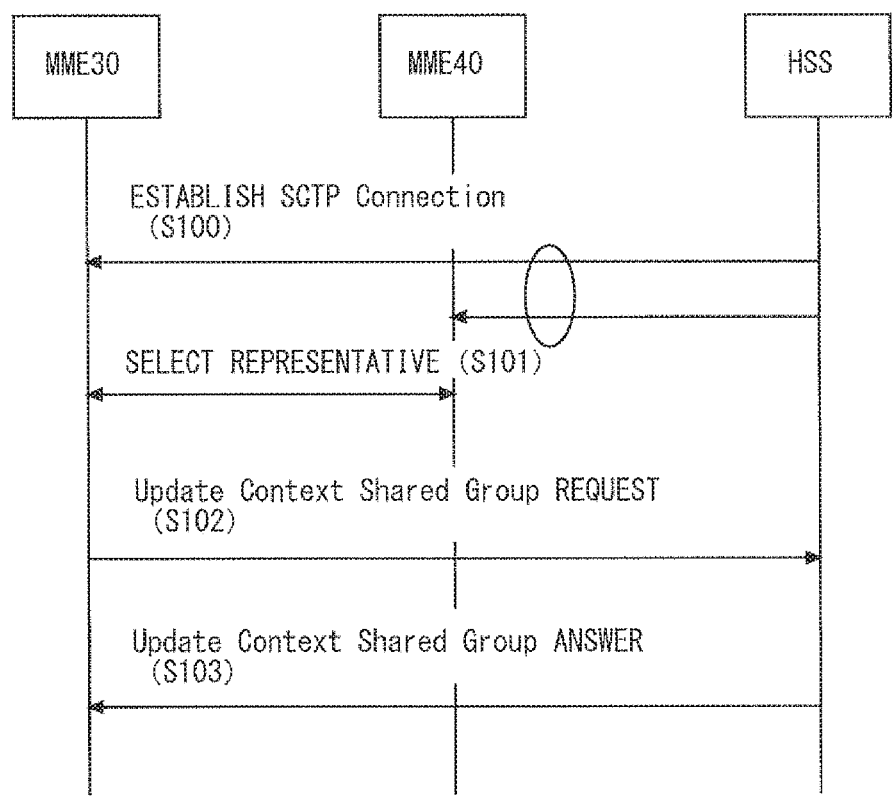
FIG. 16 shows a processing flow of notifying information on the context sharing group from the MME to the HSS according to the second embodiment.

In the following, with reference to FIG. 16, a description will be given of a processing flow, which is different from that shown in FIG. 15, of notifying context sharing group information according to the second embodiment of the present invention. Firstly, similarly to step S90 in FIG. 15, the MME 30 and the MME 40 establish an SCTP Connection (S100). Next, the MME 30 and the MME 40 undergo the representative selecting process of determining which one of the MME 30 and the MME 40 is the representative MME (S101). The representative selecting process is executed among a plurality of MMEs belonging to an identical context sharing group. Here, it is assumed that the MME 30 is selected as the representative MME.

Next, the MME 30 being the representative MME transmits, to the HSS 80, an Update Context Shared Group REQUEST message, setting thereon the context sharing group, the Origin-Host of every MME belonging to the context sharing group, and the WF of every MME belonging to the context sharing group (S102). Next, as a response to the Update Context Shared Group REQUEST message, the HSS 80 transmits an Update Context Shared Group ANSWER message to the MME 30 (S103).

Figure 17:
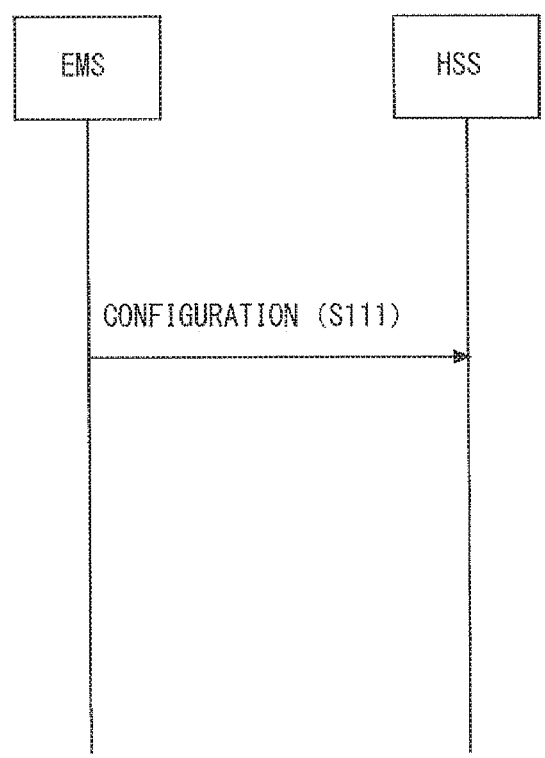
FIG. 17 shows a processing flow of notifying information on the context sharing group from the MME to the HSS according to the second embodiment.

In the following, with reference to FIG. 17, a description will be given of a processing flow, which is different from those shown in FIGS. 15 and 16, of notifying context sharing group information according to the second embodiment of the present invention. In FIG. 17, the EMS (Element Management System) apparatus registers, on the HSS 80, information on the context sharing group and the WF of every MME belonging to the context sharing group (S111).

In FIGS. 7 to 17, the eNB 70, the S-GW 90, and the HSS 80 having received the information on the context sharing group manage the information on the context sharing group as shown in FIG. 18. In the management information shown in FIG. 18, the context sharing groups and the MMEs belonging to respective context sharing groups are managed in association with each other. Further, the values of the WF set on the MMEs are also managed in association with respective MMEs. To a context sharing group A, the MME 30 to the MME #N belong. To a context sharing group B, the MME 50 and the MME 60 belong. Further, for example, the management information shows that the MME 30 belongs to the context sharing group A, and has a value of 50 as the WF.

Further, information that identifies the MME may be different depending on the type of the node. For example, the eNB may use the GUMMEI as the identification information of the MMEs; the SGW may use the IP address as the identification information of the MMEs; and the HSS may use the Origin-Host as the identification information of the MMEs.

In the following, with reference to FIGS. 19 and 20, a description will be given of a flow of call processing according to the second embodiment of the present invention. Firstly, when the user pushes down the power button whereby the apparatus is activated, the UE 110 transmits an NAS (Non-Access Stratum): Attach Request message to the eNB 70 (S121). The UE 110 sets a GUTI (Globally Unique Temporary Identifier) on the NAS: Attach Request message. The GUTI is information formed by the GUMMEI and an M-TMSI (Temporary Mobile Subscriber Identity). The GUTI is temporary identification information used for uniquely identifying the UE.

Next, the eNB 70 selects an MME to be the destination of the NAS: Attach Request message (S122). In selecting the MME, the eNB 70 specifies the GUMMEI from the GUTI set on the NAS: Attach Request message. The GUMMEI specified based on the GUTI represents the MME at which context information relating to the UE 110 was generated or the MME that was selected by the eNB in the previous Attach process. The eNB 70 can specify, based on the management information shown in FIG. 18, the context sharing group to which the MME identified by the GUMMEI belongs. The eNB 70 selects an MME according to the WF out of the MMEs belonging to the specified context sharing group. In FIG. 19, it is assumed that the eNB 70 selects the MME 30.

Next, the eNB 70 transmits an NAS: Attach REQUEST/ S1AP: Initial UE message to the selected MME (S123). Next, in order to retrieve the authentication vector (Authentication Vector: AV) relating to the UE 110, the MME 30 selects an Authentication Information REQUEST message to the HSS 80 (S124). Next, the HSS 80 selects an MME to be the destination of an Authentication Information ANSWER message on which the AV is set (S125). The HSS 80 specifies the context sharing group to which the MME 30 being the sender of the Authentication Information REQUEST message belongs, using the management information shown in FIG. 18. The HSS 80 selects, out of the MMEs belonging to the specified context sharing group, an MME according to the WF. In FIG. 19, it is assumed that the HSS 80 selects the MME #N. It is assumed that the MME #N belongs to the context sharing group A to which the MME 30 similarly belongs.

Next, the HSS 80 transmits the Authentication Information ANSWER message to the selected MME #N (S126). In this manner, the HSS 80 can transmit the Authentication Information ANSWER message to the MME #N which is not the MME 30 being the sender of the Authentication Information REQUEST message. Next, the MME #N transmits an Authentication REQUEST message to the eNB 70 (S127).

Figure 20:
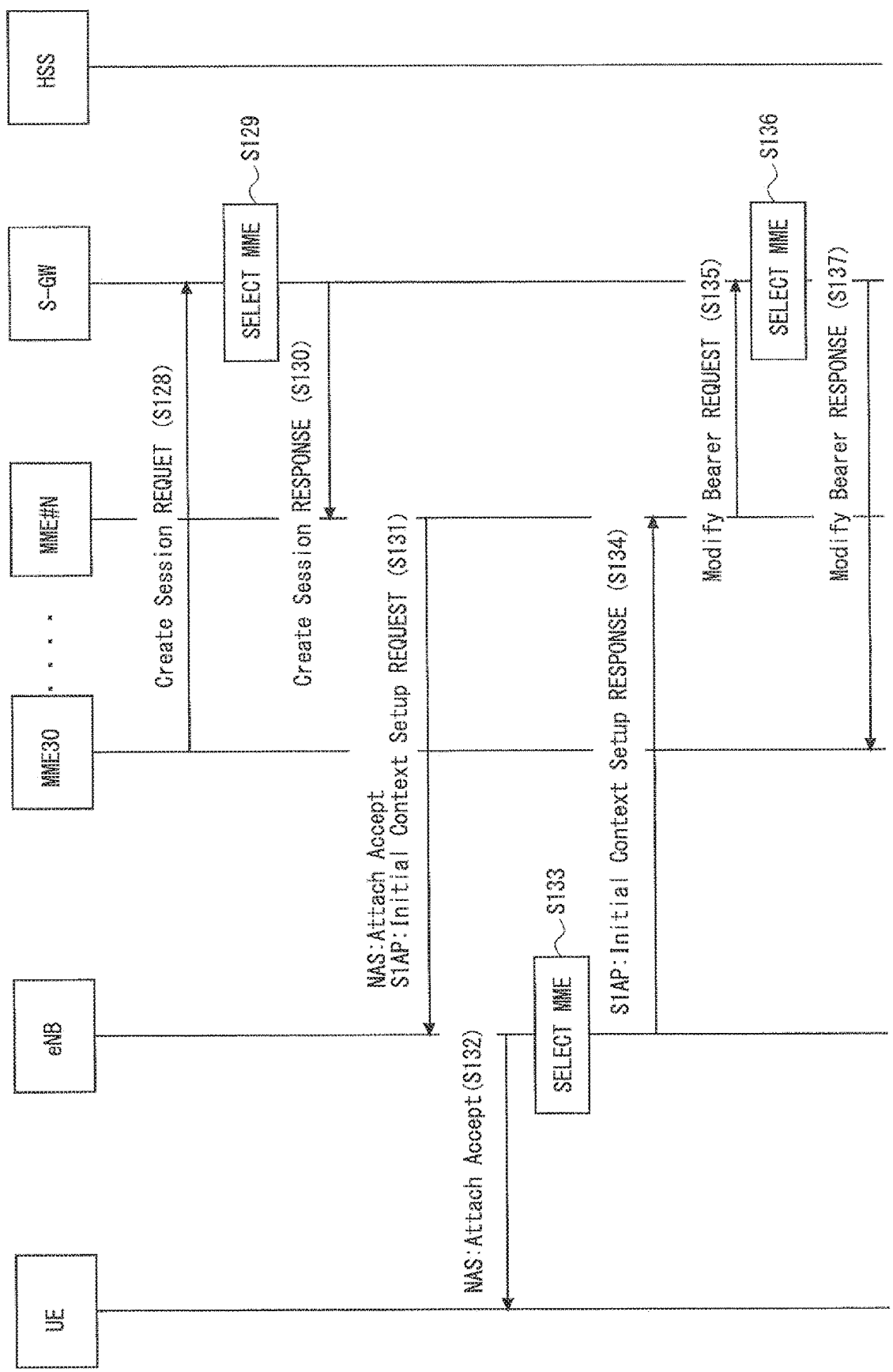
FIG. 20 shows call processing according to the second embodiment.

Referring next to FIG. 20, in order to generate a session with the S-GW 90, the MME 30 transmits a Create Session REQUEST message to the S-GW 90 (S128). Next, the S-GW 90 selects an MME to be the destination of a Create Session RESPONSE message (S129). The S-GW 90 specifies the context sharing group to which the MME 30 being the sender of the Create Session REQUEST message belongs, using the management information shown in FIG. 18. The S-GW 90 selects, out of the MMEs belonging to the specified context sharing group, an MME according to the WF. In FIG. 20, it is assumed that the S-GW 90 selects the MME #N.

Next, the S-GW 90 transmits the Create Session RESPONSE message to the selected MME #N (S130). In this manner, the S-GW 90 can transmit the Create Session RESPONSE message to the MME #N which is not the MME 30 being the sender of the Create Session REQUEST message.

Next, the MME #N transmits an NAS: Attach Accept/S1AP: Initial Context Setup REQUEST message to the eNB 70 (S131). In step S131, the eNB 70 can receive the NAS: Attach Accept message from the MME #N which is not the MME 30 being the destination of the NAS: Attach REQUEST message.

Next, the eNB 70 transmits an NAS: Attach Accept message to the UE 110 (S132). Next, when the eNB 70 receives the S1AP: Initial Context Setup REQUEST message in step S131, the eNB 70 selects an MME to be the destination of an S1AP: Initial Context Setup RESPONSE message (S133). Here, it is assumed that the eNB 70 selects the MME #N out of the context sharing group A. Next, the eNB 70 transmits the S1AP: Initial Context Setup RESPONSE message to the selected MME #N. In this manner, the eNB 70 can transmit the S1AP: Initial Context Setup RESPONSE message to the MME #N which is not the MME 30 being the destination of the NAS: Attach REQUEST message in step S123.

Next, the MME #N transmits a Modify Bearer REQUEST message to the S-GW 90 (S135). Next, the S-GW 90 operates similarly in step S129 in order to select an MME to be the destination of the Modify Bearer RESPONSE message (S136). Here, it is assumed that the S-GW 90 selects the MME 30. Next, the S-GW 90 transmits the Modify Bearer RESPONSE message to the selected MME 30.

As has been described above, an MME can share the context information relating to the UE with other MME belonging to an identical context sharing group. Accordingly, even if a call processing message is transmitted by the eNB, the S-GW, and the HSS to an arbitrary MME belonging to the context sharing group, the call processing of the UE can be continued.

Further, the eNB, the S-GW, and the HSS being the node apparatuses around the MMEs can transmit a call processing message to any MME belonging to the context sharing group in performing the call processing of the UE. Accordingly, the eNB, the S-GW, and the HSS achieve load balancing in call processing executed at the MMEs.

Third Embodiment

Figure 21:
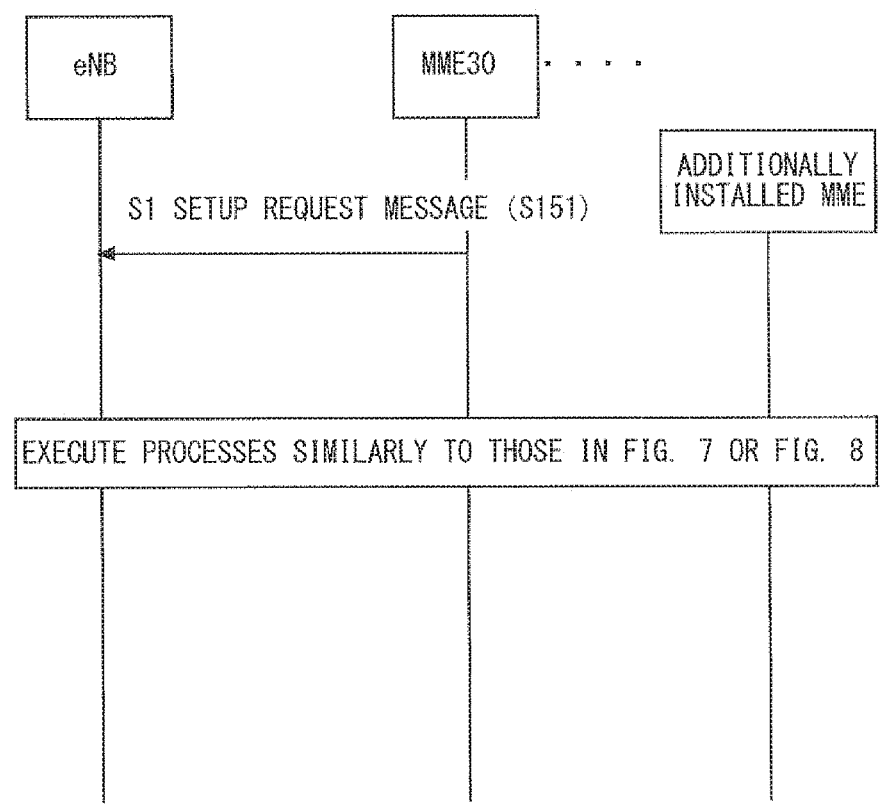
FIG. 21 shows a processing flow of notifying the eNB of information on the context sharing group when an MME is additionally installed according to a third embodiment.

In the following, with reference to FIG. 21, a description will be given of a processing flow of notifying context sharing group information from an MME to the eNB in the case where an MME is additionally installed according to a third embodiment of the present invention.

Firstly, after an MME is additionally installed, other MME belonging to the context sharing group to which the additionally installed MME belongs transmits, to the eNB 70, an S1 SETUP REQUEST message of requesting activation of an S1 SETUP message (S151). In FIG. 21, the additionally installed MME belongs to the context sharing group A, and the MME 30 belonging to the context sharing group A transmits the S1 SETUP REQUEST message to the eNB 70.

Figure 7:
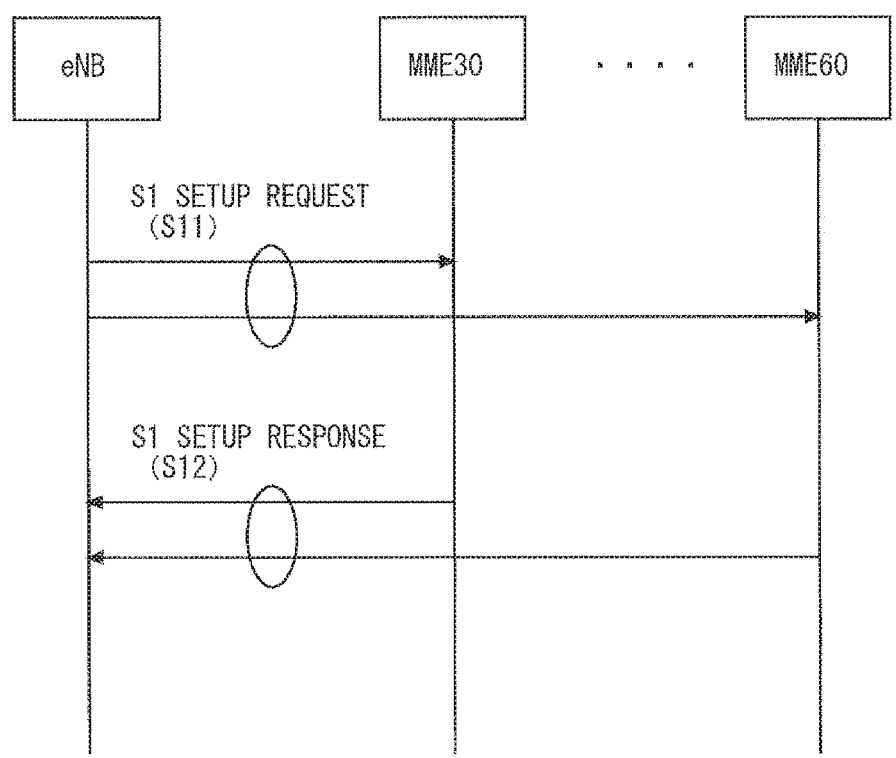
FIG. 7 shows a processing flow of notifying information on a context sharing group from the MME to the eNB according to the second embodiment.
Figure 8:
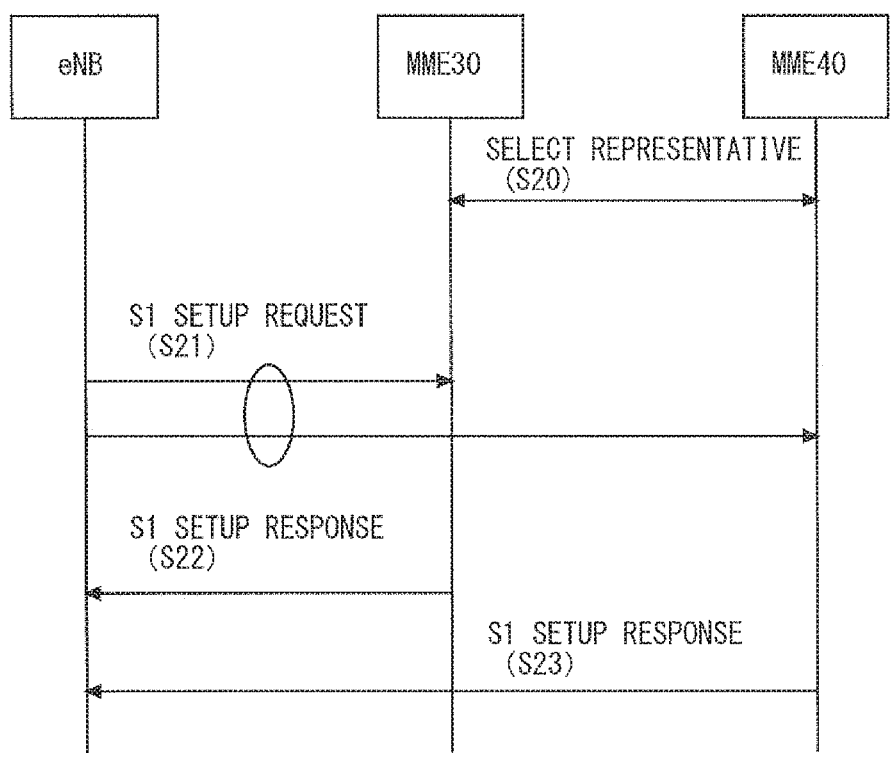
FIG. 8 shows a processing flow of notifying information on the context sharing group from the MME to the eNB according to the second embodiment.
Figure 9:
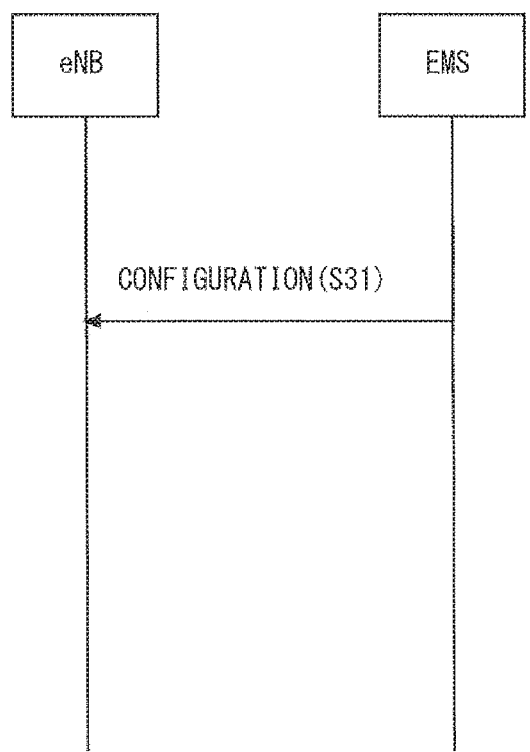
FIG. 9 shows a processing flow of notifying information on the context sharing group from the MME to the eNB according to the second embodiment.

From that point onward, the processes shown in FIG. 7 or FIG. 8 are executed, and the eNB 70 receives information on the context sharing group set on the S1 SETUP RESPONSE message.

The MME that transmits the S1 SETUP REQUEST message may be, for example, the MME selected as the representative before the additionally installed MME belongs to the context sharing group, or may be the MME receiving information on the additionally installed MME from the administrator or the like. Further, when the additionally installed MME and the preexisting MME undergo the representative selecting process and the additionally installed MME is selected as the representative MME, the additionally installed MME may transmit the S1 SETUP REQUEST message.

Further, instead of the MME transmitting the S1 SETUP REQUEST message, as shown in FIG. 9, the EMS apparatus may register, on the eNB 70, information on the additionally installed MME. When the information on the additionally installed MME has registered, as shown in FIGS. 7 and 8, the eNB 70 may transmit the S1 SETUP REQUEST message to every MME or just the additionally installed MME.

In the following, with reference to FIG. 22, a description will be given of a processing flow of notifying context sharing group information from an MME to the S-GW in the case where an MME is additionally installed according to the third embodiment of the present invention. Firstly, the additionally installed MME transmits, to the S-GW 90, a GTP Echo REQUEST message, setting thereon the context sharing group to which the additionally installed MME belongs and the WF (S161).

The S-GW 90 manages the information shown in FIG. 18. Upon receipt of the GTP Echo REQUEST message, the S-GW 90 adds, to the information shown in FIG. 18, the information on the additionally installed MME, thereby updating the management information (S162). Next, the S-GW 90 transmits a GTP Echo RESPONSE message to the additionally installed MME (S163).

In the following, with reference to FIG. 23, a description will be given of a processing flow, which is different from that shown in FIG. 22, of notifying context sharing group information from an MME to the S-GW in the case where an MME is additionally installed according to the third embodiment of the present invention.

Firstly, when an MME is additionally installed, the representative MME is selected out of the context sharing group to which the additionally installed MME belongs (S171). Here, it is assumed that the MME #N is selected as the representative MME. Next, the representative MME transmits, to the S-GW 90, a GTP Echo REQUEST message, setting thereon the context sharing group and the WF of every MME belonging to the context sharing group (S172).

Figure 22:
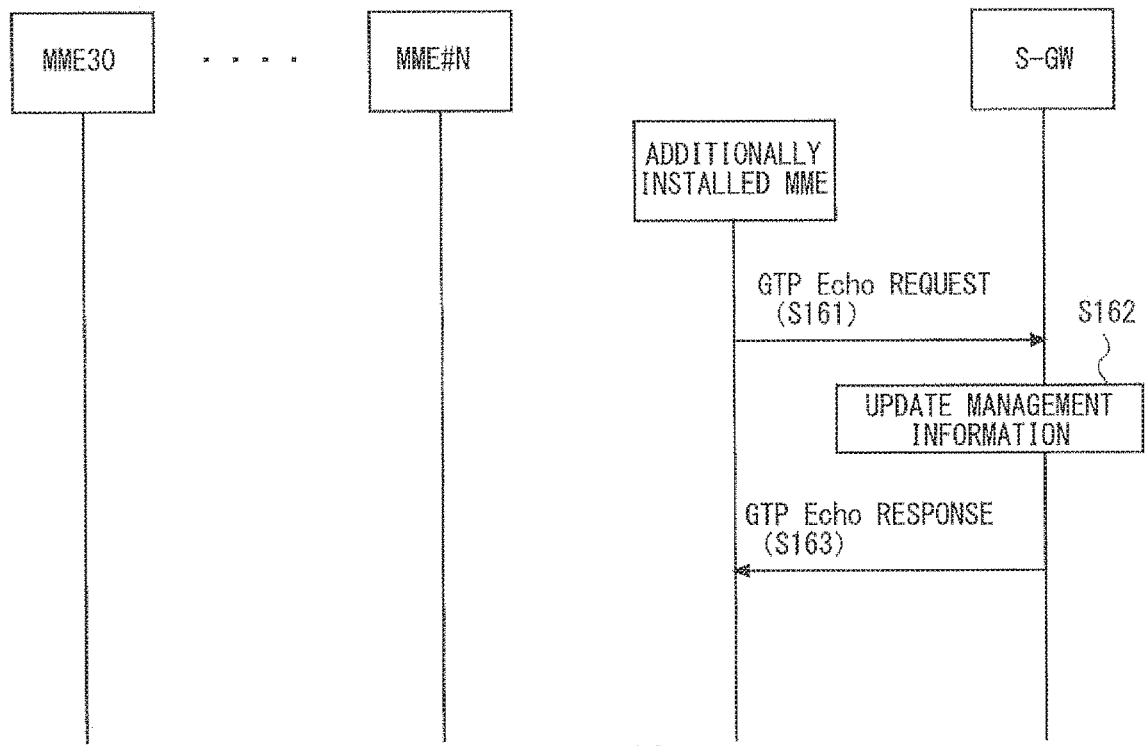
FIG. 22 shows a processing flow of notifying the S-GW of information on the context sharing group when an MME is additionally installed according to the third embodiment.

Steps S173 and S174 are similar to steps S162 and S163 in FIG. 22 and, therefore, the detailed description thereof will not be repeated. Note that, in step S174, the S-GW 90 transmits a GTP Echo REQUEST message to the representative MME.

In the following, with reference to FIG. 24, a description will be given of a processing flow, which is different from those shown in FIGS. 22 and 23, of notifying context sharing group information from an MME to the S-GW in the case where an MME is additionally installed according to the third embodiment of the present invention.

Figure 23:
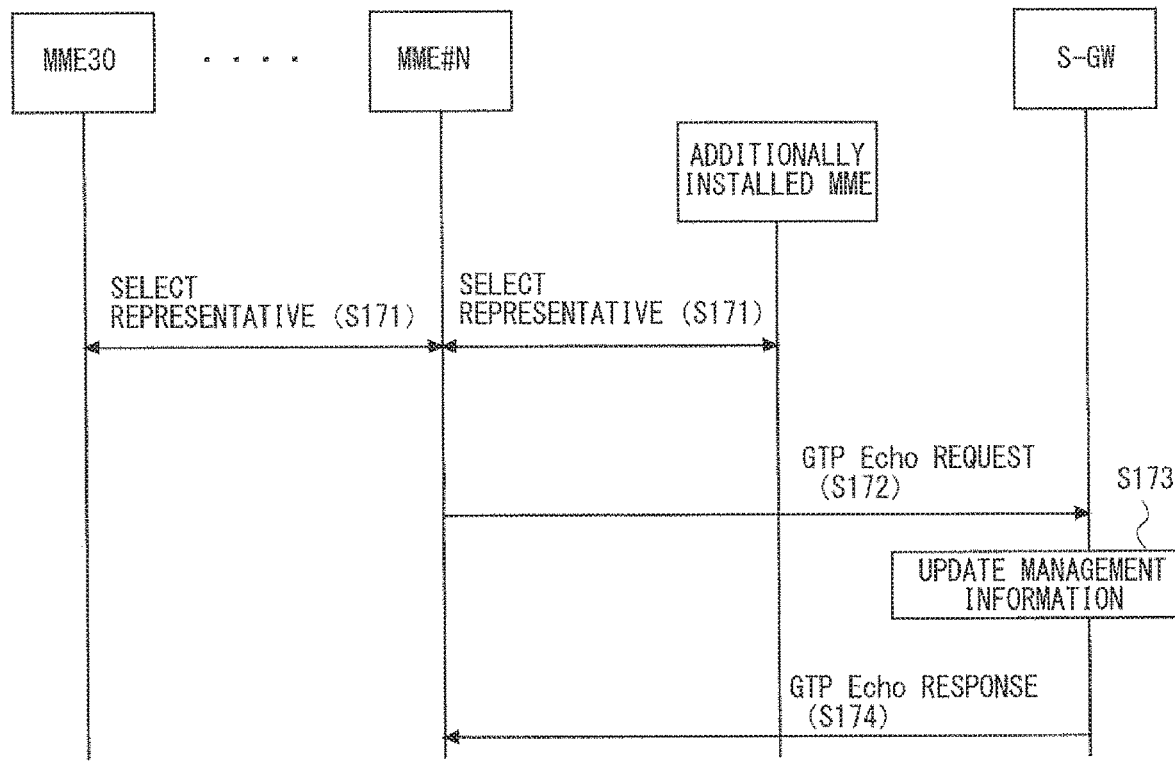
FIG. 23 shows a processing flow of notifying the S-GW of information on the context sharing group when an MME is additionally installed according to the third embodiment.

Step S181 is similar to step S171 in FIG. 23 and, therefore, the detailed description thereof will not be repeated. Next, the S-GW 90 transmits a GTP Echo REQUEST message to every MME belonging to the MME group (S182). Next, the representative MME transmits, to the S-GW 90, a GTP Echo RESPONSE message, setting thereon the context sharing group and the WF of every MME belonging to the context sharing group (S183). Here, other MME not being the representative MME may also transmit a GTP Echo RESPONSE message to the S-GW 90, without setting thereon information such as the context sharing group. Step S184 is similar to step S173 in FIG. 23 and, therefore, the detailed description thereof will not be repeated.

Figure 24:
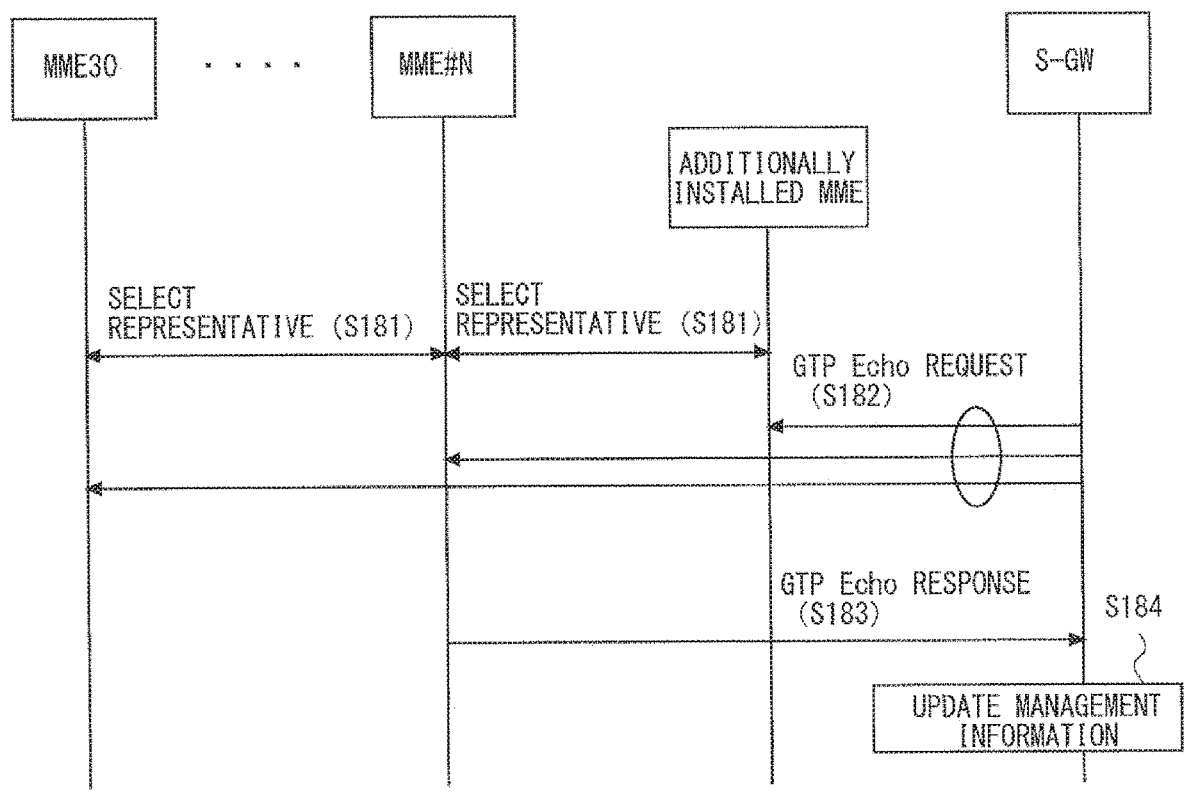
FIG. 24 shows a processing flow of notifying the S-GW of information on the context sharing group when an MME is additionally installed according to the third embodiment.

Further, instead of using a GTP Echo REQUEST message and a GTP Echo RESPONSE message as shown in FIGS. 22 to 24, the EMS apparatus may register, on the S-GW 90, information on the additionally installed MME as shown in FIG. 14. Further, instead of using a GTP Echo REQUEST message and a GTP Echo RESPONSE message as shown in FIGS. 22 to 24, the information on the additionally installed MME may be transmitted to the S-GW 90 using a novel message not currently defined in the 3GPP.

In the following, a description will be given of a processing flow of notifying context sharing group information from an additionally installed MME to the HSS according to the third embodiment of the present invention. When an MME is additionally installed, similarly to FIGS. 15 and 16, an SCTP Connection is established between the additionally installed MME and the HSS 80. After the SCTP Connection is established, similarly to the processes shown in FIGS. 15 and 16, the HSS is notified of information on the additionally installed MME such as the context sharing group using an Update Context Shared Group REQUEST message.

As has been described above, when an MME is additionally installed, the eNB 70, the S-GW 90, and the HSS 80 can keep track of the MME being additionally installed, and update the management information. By selecting the additionally installed MME according to the value of the WF, the eNB 70, the S-GW 90, and the HSS 80 can perform call processing using the additionally installed MME. That is, the eNB 70, the S-GW 90, and the HSS 80 can dynamically transmit a call processing message to the additionally installed MME.

Fourth Embodiment

In the following, with reference to FIG. 25, a description will be given of a processing flow of updating information on the eNB 70 in the case where an MME is uninstalled according to a fourth embodiment of the present invention. Firstly, an uninstallation-target MME starts an uninstalling process (S191). The uninstalling process of the MME may be, for example, turning OFF the power of the MME, or shutting down the MME.

Upon the uninstalling process of the MME, the S1AP connection between the uninstalled MME and the eNB 70 is disconnected. At this time, the eNB 70 detects the disconnection of the S1AP (S192). Next, the eNB 70 deletes the information on the uninstalled MME from the management information described with reference to FIG. 18, thereby updating the management information (S193). Here, when the MME belonging to the context sharing group is just the uninstalled MME, the eNB 70 may also disconnect the RRC connection.

Figure 25:
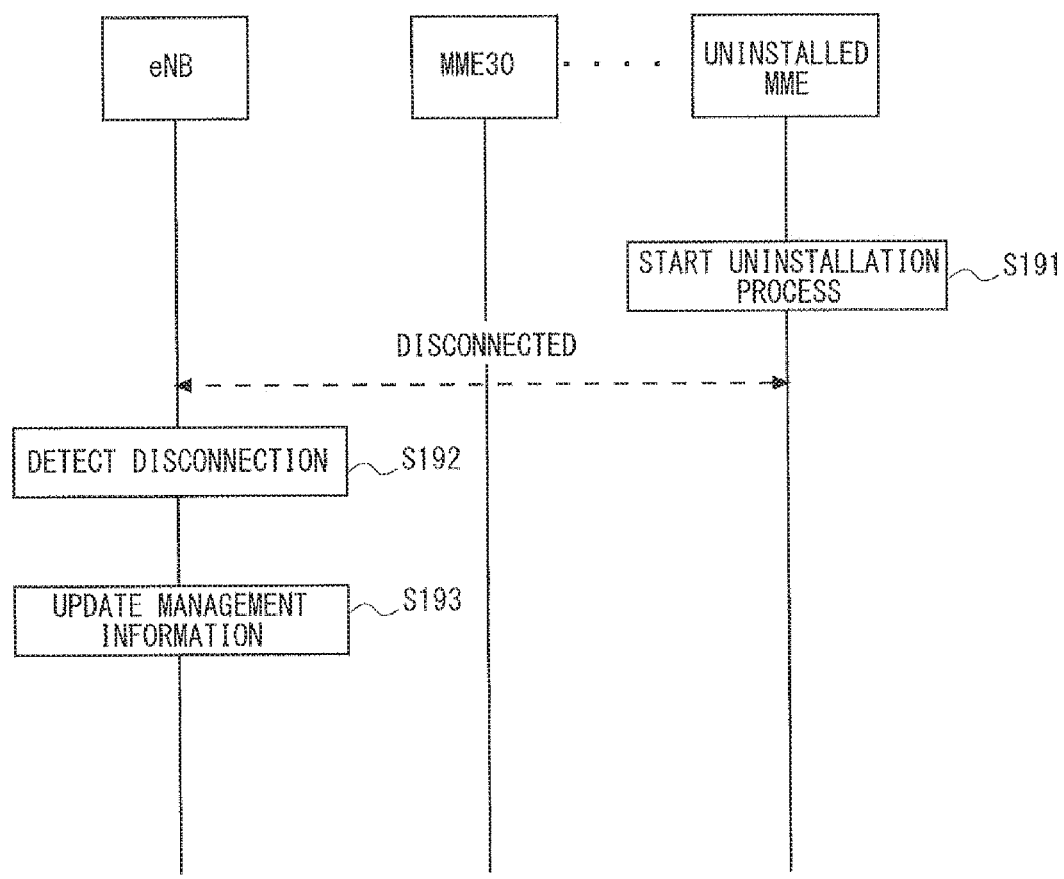
FIG. 25 shows a processing flow of notifying the eNB of information on the context sharing group when an MME is uninstalled according to the third embodiment.

While the description with reference to FIG. 25 has been given of the case where the MME is uninstalled, the processing flow shown in FIG. 25 is also applicable to the case where any MME has failed.

Figure 26:
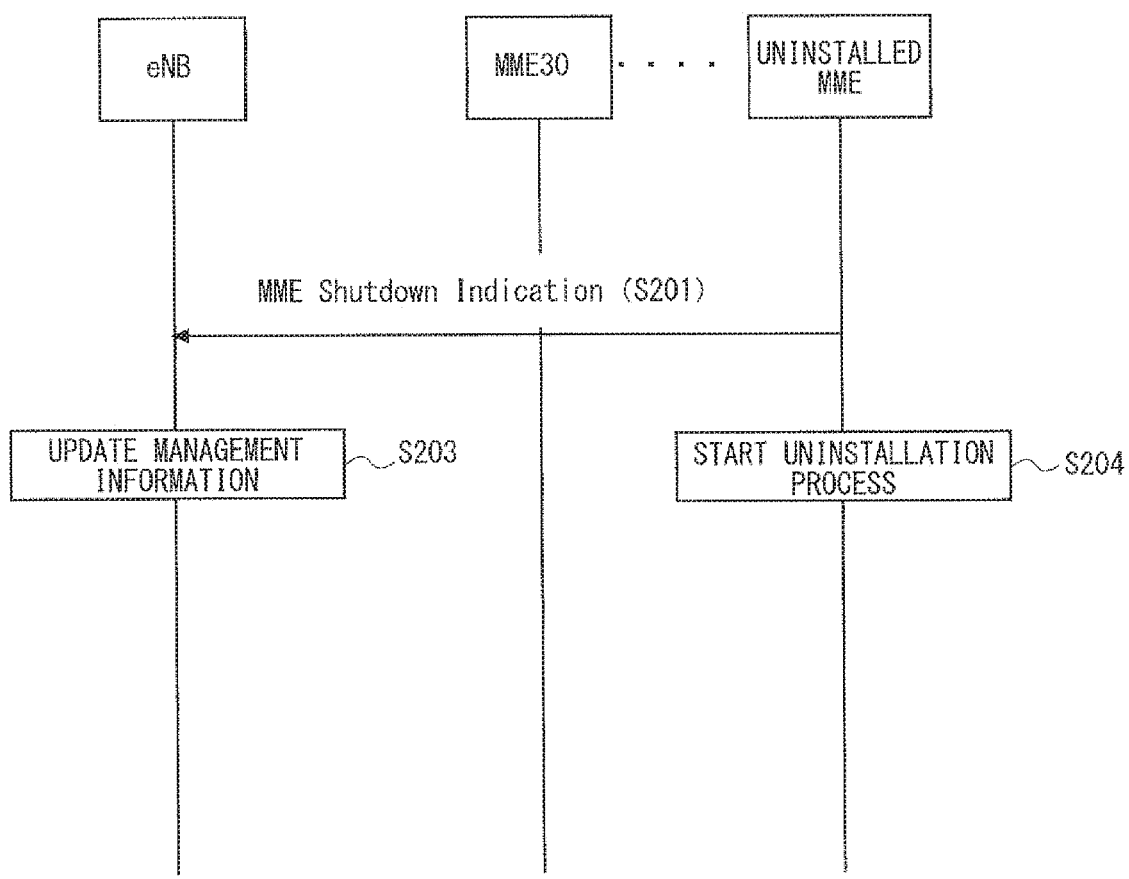
FIG. 26 shows a processing flow of notifying the eNB of information on the context sharing group when an MME is uninstalled according to a fourth embodiment.

In the following, with reference to FIG. 26, a description will be given of a processing flow, which is different from that shown in FIG. 25, of updating information on the eNB 70 in the case where an MME is uninstalled according to the fourth embodiment of the present invention. Before starting the uninstalling process, the uninstallation-target MME transmits an MME Shutdown Indication message to the eNB 70 (S201). The uninstallation-target MME transmits the MME Shutdown Indication message to the eNB 70 in order to notify of the start of the uninstalling process. Further, the MME Shutdown Indication message may be a message called by a different name.

The uninstallation-target MME may set, on the MME Shutdown Indication message, the context sharing group, the GUMMEI, and the shutdown time. The shutdown time may be, for example, information representing the time point at which the uninstallation-target MME starts the uninstalling process, or the remaining seconds until the MME starting the uninstalling process. In this manner, the uninstallation-target MME transmitting the shutdown time to the eNB 70 prevents, for example, call blocking due to sudden uninstallation of the MME. For example, the eNB 70 having received the MME Shutdown Indication message may put higher priority on the call processing with the uninstallation-target MME.

In the following, with reference to FIG. 27, a description will be given of a processing flow of updating information on the S-GW 90 in the case where an MME is uninstalled according to the fourth embodiment of the present invention. The S-GW 90 periodically transmits a GTP Echo REQUEST message to the MME in order to check whether or not the S-GW 90 is normally connected to the MME (S211). Here, when the MME is uninstalled, the S-GW 90 will not receive a response signal to the transmitted GTP Echo REQUEST message. Accordingly, the S-GW 90 repeats transmission of the GTP Echo REQUEST message (S212).

Next, when the S-GW 90 does not receive a response message despite the transmission of the GTP Echo REQUEST message repeated for a predetermined number of times, the S-GW 90 determines that the MME has been uninstalled or the MME has been failed. In this case, the S-GW 90 deletes the entry of the MME whose uninstallation or failure is determined, thereby updating the management information in FIG. 18 (S213).

In the following, with reference to FIG. 28, a description will be given of a processing flow, which is different from that shown in FIG. 27, of updating information on the S-GW 90 in the case where an MME is uninstalled according to the fourth embodiment of the present invention. Before starting the uninstalling process, the uninstallation-target MME transmits a GTP Echo REQUEST message to the S-GW 90, setting thereon information of the uninstallation (S221). The uninstallation-target MME may set, on the GTP Echo REQUEST message, for example, the context sharing group to which the uninstallation-target MME belongs, an uninstallation flag indicative of uninstallation or the like, as a new IE (Information Element).

Next, upon receipt of the GTP Echo REQUEST message in step S221, the S-GW 90 deletes the entry of the MME to be uninstalled, thereby updating the management information in FIG. 18 (S222). Next, the S-GW 90 transmits a GTP Echo RESPONSE message to the uninstallation-target MME (S223).

In the following, with reference to FIG. 29, a description will be given of a processing flow, which is different from those shown in FIGS. 27 and 28, of updating information on the S-GW 90 in the case where an MME is uninstalled according to the fourth embodiment of the present invention. In FIG. 28, the uninstallation-target MME notifies the S-GW 90 of the uninstallation by transmitting a GTP Echo REQUEST message. On the other hand, in FIG. 29, the uninstallation-target MME notifies the S-GW 90 of the uninstallation by transmitting an MME Shutdown Indication message. The uninstallation-target MME may set, on the MME Shutdown Indication message, the context sharing group and the shutdown time. The shutdown time may be, for example, information representing the time point at which the uninstallation-target MME starts the uninstalling process, or the remaining seconds until the MME starting the uninstalling process.

Next, upon receipt of the MME Shutdown Indication message in step S221, the S-GW 90 deletes the entry of the MME to be uninstalled, thereby updating the management information in FIG. 18 (S232). Here, the S-GW 90 ends the process without transmitting a response message to the MME Shutdown Indication message.

Figure 27:
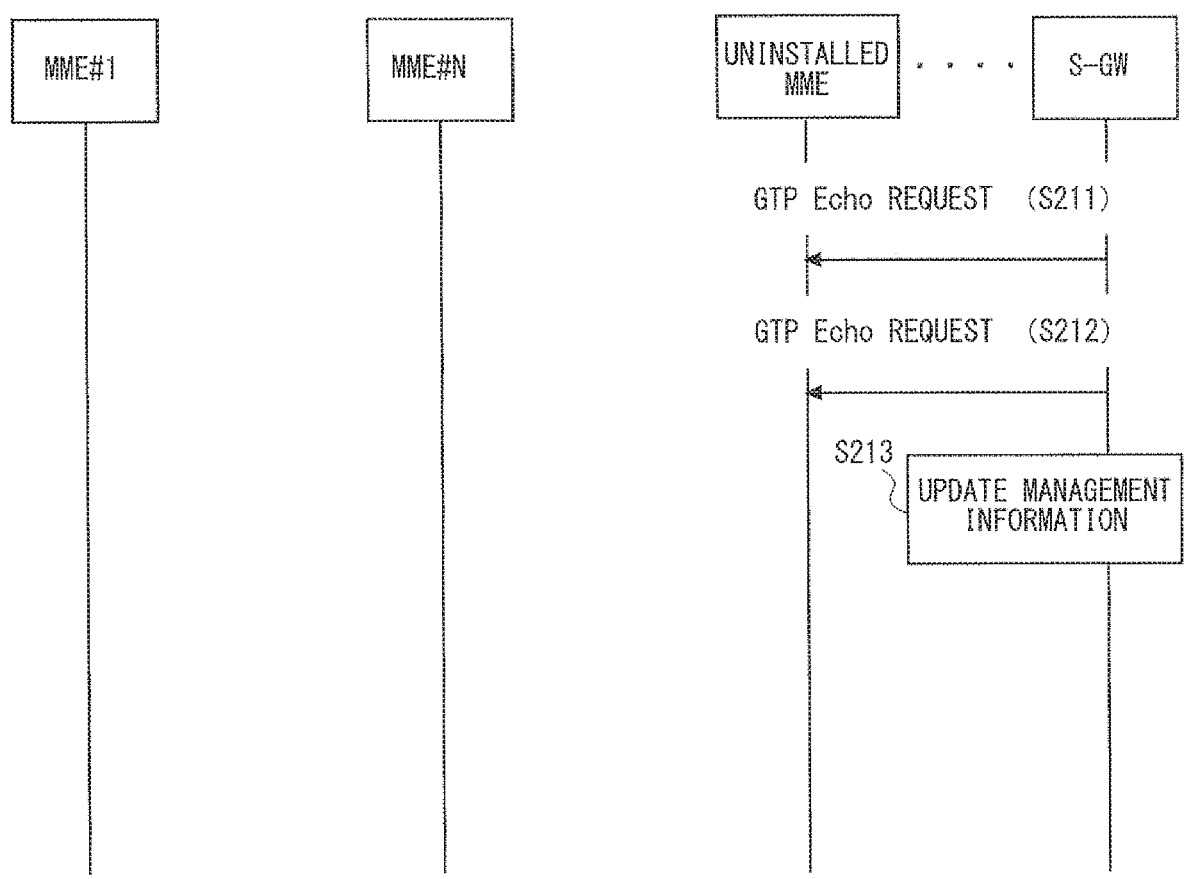
FIG. 27 shows a processing flow of notifying the S-GW of information on the context sharing group when an MME is uninstalled according to the fourth embodiment.
Figure 28:
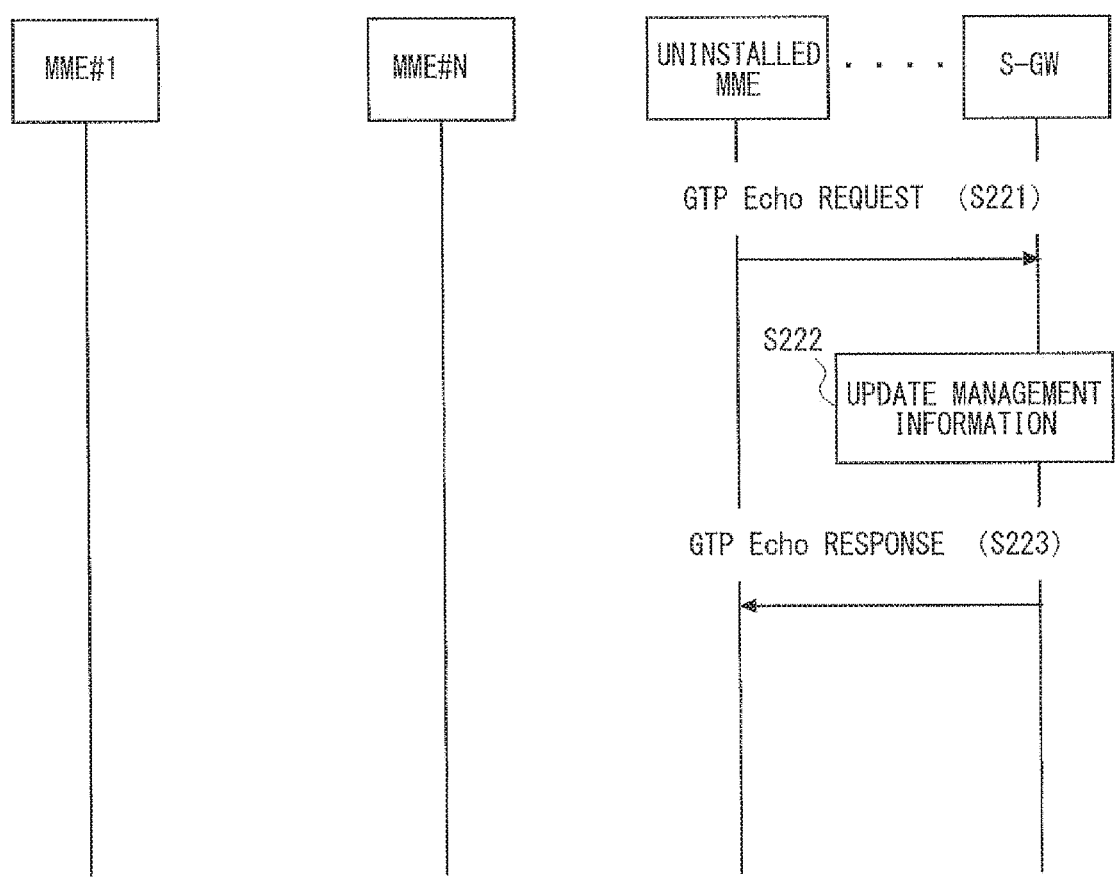
FIG. 28 shows a processing flow of notifying the S-GW of information on the context sharing group when an MME is uninstalled according to the fourth embodiment.
Figure 29:
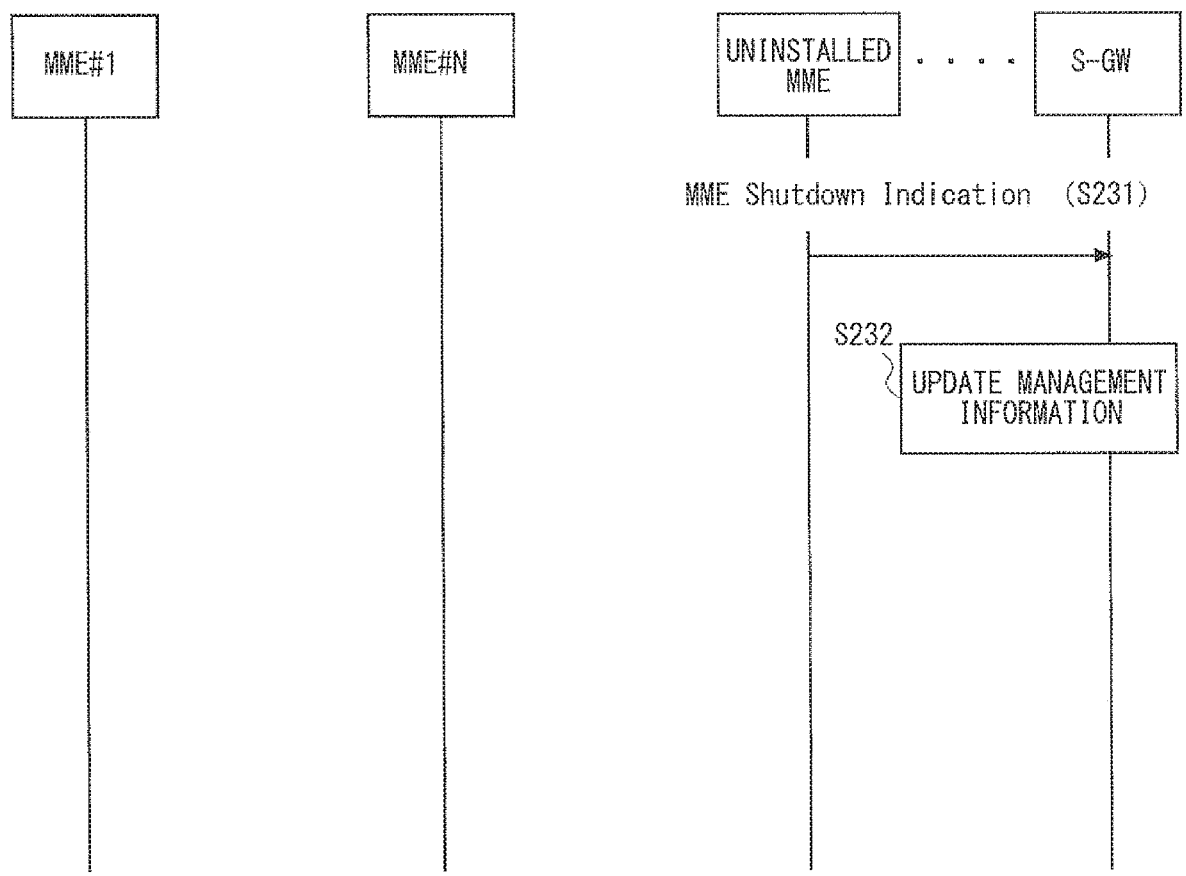
FIG. 29 shows a processing flow of notifying the S-GW of information on the context sharing group when an MME is uninstalled according to the fourth embodiment.

Further, instead of using a GTP Echo REQUEST message and an MME Shutdown Indication message as shown in FIGS. 27 to 29, the EMS apparatus may register, on the S-GW 90, information on the uninstalled MME as shown in FIG. 14. Further, instead of using a GTP Echo REQUEST message and an MME Shutdown Indication message as shown in FIGS. 27 to 29, information on the uninstalled MME may be transmitted to the S-GW 90 using a novel message not currently defined in the 3GPP.

Figure 30:
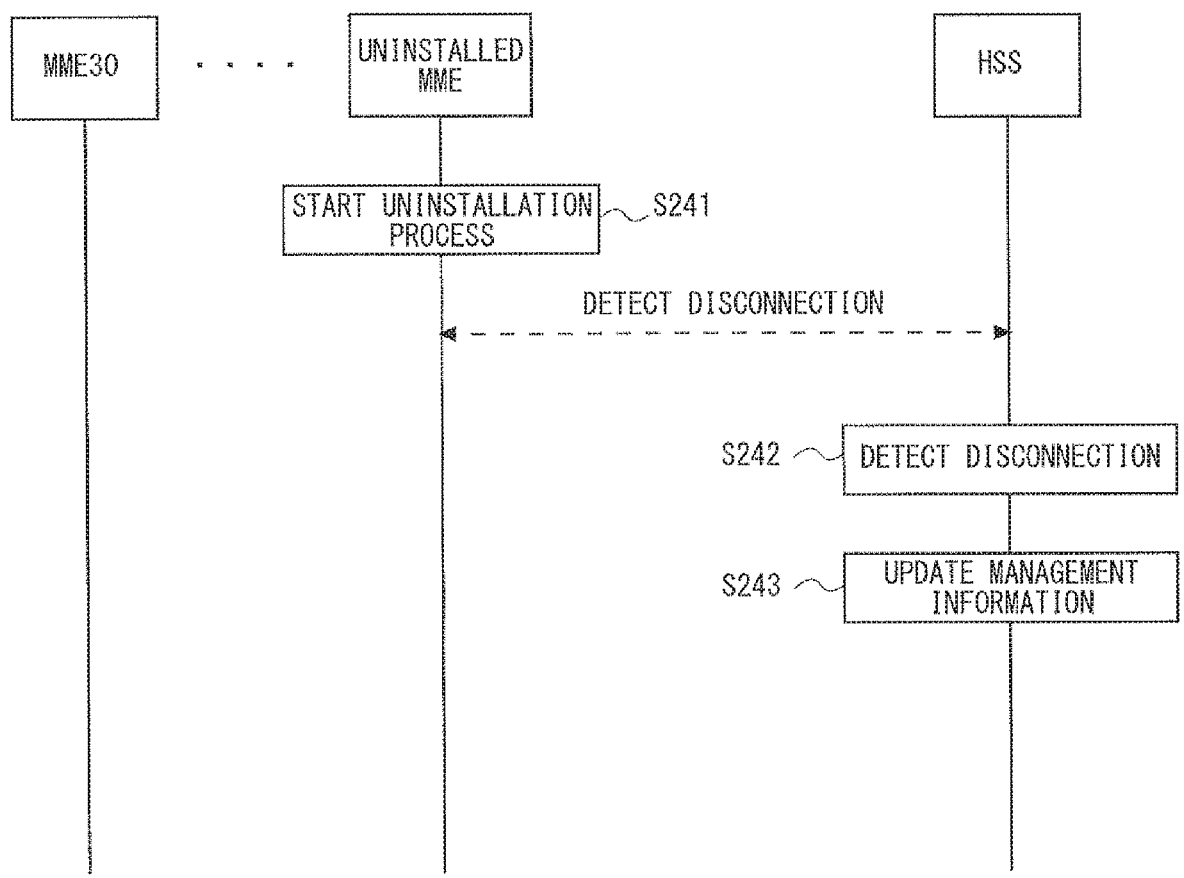
FIG. 30 shows a processing flow of notifying the HSS of information on the context sharing group when an MME is uninstalled according to the fourth embodiment.

In the following, with reference to FIG. 30, a description will be given of a processing flow of updating information on the HSS 80 in the case where an MME is uninstalled according to the fourth embodiment of the present invention. Firstly, an uninstallation-target MME starts an uninstalling process (S241). The uninstalling process of the MME may be, for example, turning OFF the power of the MME, or shutting down the MME.

Upon the uninstalling process of the MME, the SCTP connection between the uninstalled MME and the HSS 80 is disconnected. At this time, the HSS 80 detects the disconnection of the SCTP (S242). Next, the HSS 80 deletes the information on the uninstalled MME from the management information described with reference to FIG. 18, thereby updating the management information (S243).

Figure 31:
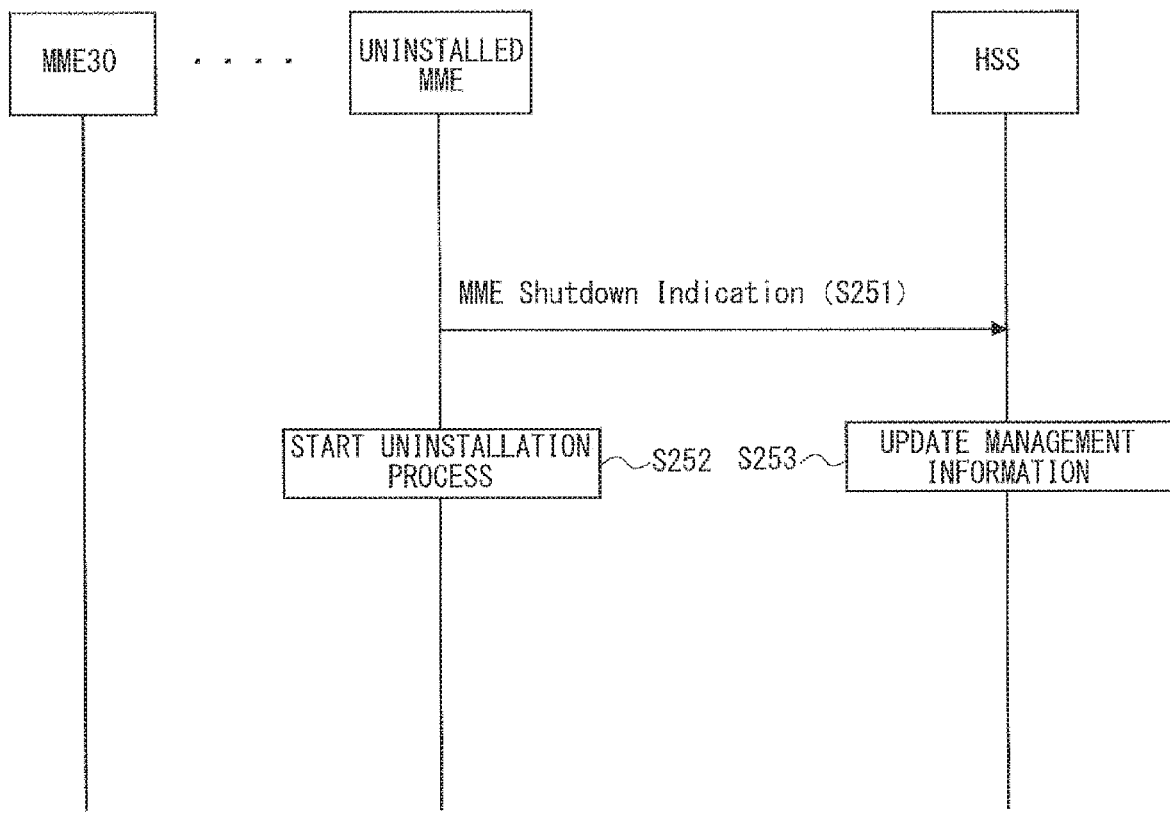
FIG. 31 shows a processing flow of notifying the HSS of information on the context sharing group when an MME is uninstalled according to the fourth embodiment.

In the following, with reference to FIG. 31, a description will be given of a processing flow, which is different from that shown in FIG. 30, of updating information on the HSS 80 in the case where an MME is uninstalled according to the fourth embodiment of the present invention. Before starting the uninstalling process, the uninstallation-target MME transmits an MME Shutdown Indication message to the HSS 80 (S252). The uninstallation-target MME transmits the MME Shutdown Indication message to the HSS 80 in order to notify of the start of the uninstalling process. Further, the MME Shutdown Indication message may be a message called by a different name.

The uninstallation-target MME may set, on the MME Shutdown Indication message, the context sharing group, the Origin-Host, and the shutdown time. The shutdown time may be, for example, information representing the time point at which the uninstallation-target MME starts the uninstalling process, or the remaining seconds until the MME starting the uninstalling process. In this manner, the uninstallation-target MME transmitting the shutdown time to the eNB 70 prevents, for example, call blocking due to sudden uninstallation of the MME. For example, the HSS 80 having received the MME Shutdown Indication message may put higher priority on the call processing with the uninstallation-target MME.

Next, the uninstallation-target MME starts the uninstalling process at the timing indicated by the shutdown time (S252). Further, the HSS 80 deletes the entry of the uninstallation-target MME from the management information shown in FIG. 18, thereby updating the management information.

As has been described above, when an MME is uninstalled, the eNB 70, the S-GW 90, and the HSS 80 can keep track of the MME being uninstalled, and update the management information. After updating the management information, the eNB 70, the S-GW 90, and the HSS 80 will not transmit a call processing message to the uninstalled MME.

Normally, when an MME is to be uninstalled, the uninstallation-target MME must transfer its retaining context information of the UE to other MME. In such a case, in general, the MME causes the UE to Detach, and to again Attach, so that the context information of the UE is newly generated at other MME. Here, when the UE in communication is caused to Detach, unfortunately the communication of the UE in communication is temporarily interrupted.

In contrast thereto, in the communication system according to the fourth embodiment, the MMEs share context information stored in an external server apparatus or the like. Accordingly, in the case where an MME is uninstalled, it is not necessary for the UE to Detach. Thus, with the communication system according to the fourth embodiment, any MME can be uninstalled without inviting an interruption of the communication of the UE.

Further, in the case where the context information is stored in a server apparatus or the like, the context information will not be lost because of uninstallation of any MME. Accordingly, in place of the uninstalled MME, the remaining MMEs can continue call processing using the context information stored in the server apparatus or the like.

Fifth Embodiment

Figure 32:
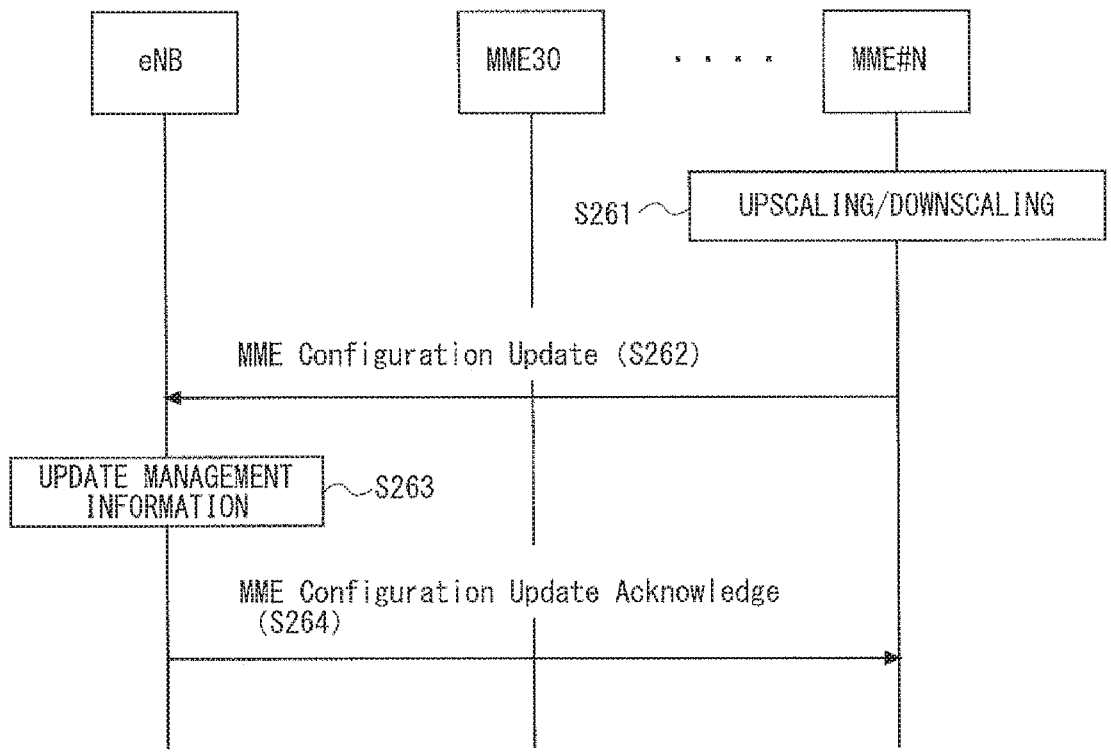
FIG. 32 shows a processing flow of notifying the eNB of information on the context sharing group when a WF of an MME is changed according to a fifth embodiment.

In the following, with reference to FIG. 32, a description will be given of a processing flow of updating information on the HSS 80 in the case where an MME is upscaled or downscaled according to a fifth embodiment of the present invention. Upscaling an MME means improving the performance of the MME, and downscaling an MME means lowering the performance of the MME. When an MME is upscaled, the upscaled MME can handle a greater amount of call processing. In such a case, the upscaled MME is provided with an increased WF value, so as to enlarge the opportunity of the upscaled MME being selected by the surrounding node apparatuses. When the MME is downscaled, the downscaled MME is provided with a reduced WF value, so as to curtail the opportunity of the downscaled MME being selected by the surrounding node apparatuses. With reference to FIG. 32, a description will be given of a processing flow of notifying the eNB 70 of any WF being changed due to upscaling or downscaling.

Firstly, it is assumed that the MME #N belonging to the context sharing group A is upscaled or downscaled (S261). Next, the MME #N transmits an MME Configuration Update message to the eNB 70 (S262). The MME #N sets, on the MME Configuration Update message, the context sharing group, the GUMMEI, and the updated WF value.

Next, the eNB 70 updates, in the management information shown in FIG. 18, the WF value of the MME #N (S263). Next, the eNB 70 transmits an MME Configuration Update Acknowledge message to the MME #N.

Further, with reference to FIG. 32, while the description has been given of the case where the MME #N having its WF changed transmits an MME Configuration Update message to the eNB 70, the representative MME belonging to the context sharing group A may transmit an MME Configuration Update message to the eNB 70. In this case, the representative MME may set, on the MME Configuration Update message, the context sharing group and the GUMMEI and the WF of every MME belonging to the context sharing group. Alternatively, the representative MME may set, on the MME Configuration Update message, the context sharing group, and the GUMMEI and the updated WF of any MME having its WF updated.

Further, as shown in FIG. 9, the EMS apparatus may register, on the eNB 70, information on the updated WF of the MME #N.

In the following, a description will be given of a processing flow of updating information on the S-GW 90 in the case where an MME is upscaled or downscaled. When an MME is upscaled or downscaled, similarly to the processes shown in FIGS. 10 to 13, the MME sets the updated WF on a GTP Echo REQUEST message or a GTP Echo RESPONSE message. Alternatively, similarly to the process shown in FIG. 14, the EMS apparatus may register, on the S-GW 90, information on the updated WF of the upscaled or downscaled MME.

In the following, a description will be given of a processing flow of updating information on the HSS 80 in the case where an MME is upscaled or downscaled. When an MME is upscaled or downscaled, similarly to the processes shown in FIGS. 15 and 16, the MME sets the updated WF on an Update Context Shared Group REQUEST message. Alternatively, similarly to the process shown in FIG. 17, the EMS apparatus may register, on the HSS 80, information on the updated WF of the upscaled or downscaled MME.

As has been described above, the communication system according to the fifth embodiment of the present invention can dynamically exerts load balancing control on MMEs according to any change in performance of the MMEs.

Further, the WF may be changed upon occurrence of congestions at an MME. For example, when congestions has occurred at any MME, the MME with the congestions may have its WF value reduced. Thus, the opportunity of the MME being selected by the surrounding node apparatuses is curtailed, whereby congestions are avoided.

Sixth Embodiment

In the following, with reference to FIGS. 33 and 34, a description will be given of a configuration in which MMEs belonging to a context sharing group use, in order to share the context information, the HSS 80 as the apparatus for storing the context information.

Figure 33:
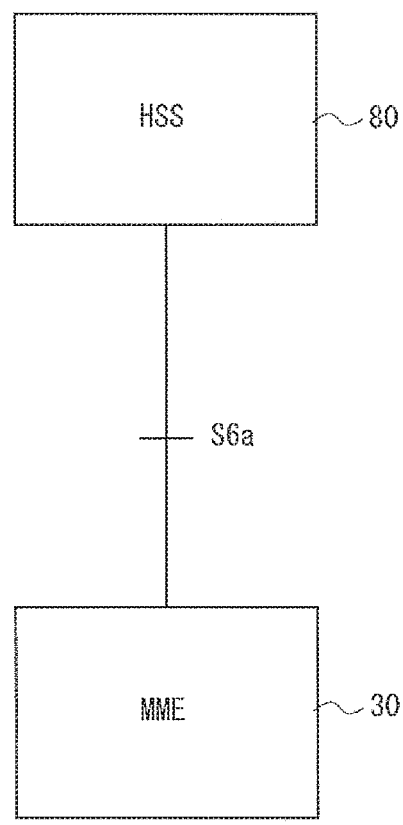
FIG. 33 illustrates an interface relating to the HSS according to a sixth embodiment.

FIG. 33 shows that the MME 30 is connected to the HSS 80 via an S6a interface. While FIG. 33 shows that the MME 30 is connected to the HSS 80, a plurality of MMEs are connected to the HSS 80 via the S6a interface.

Figure 34:
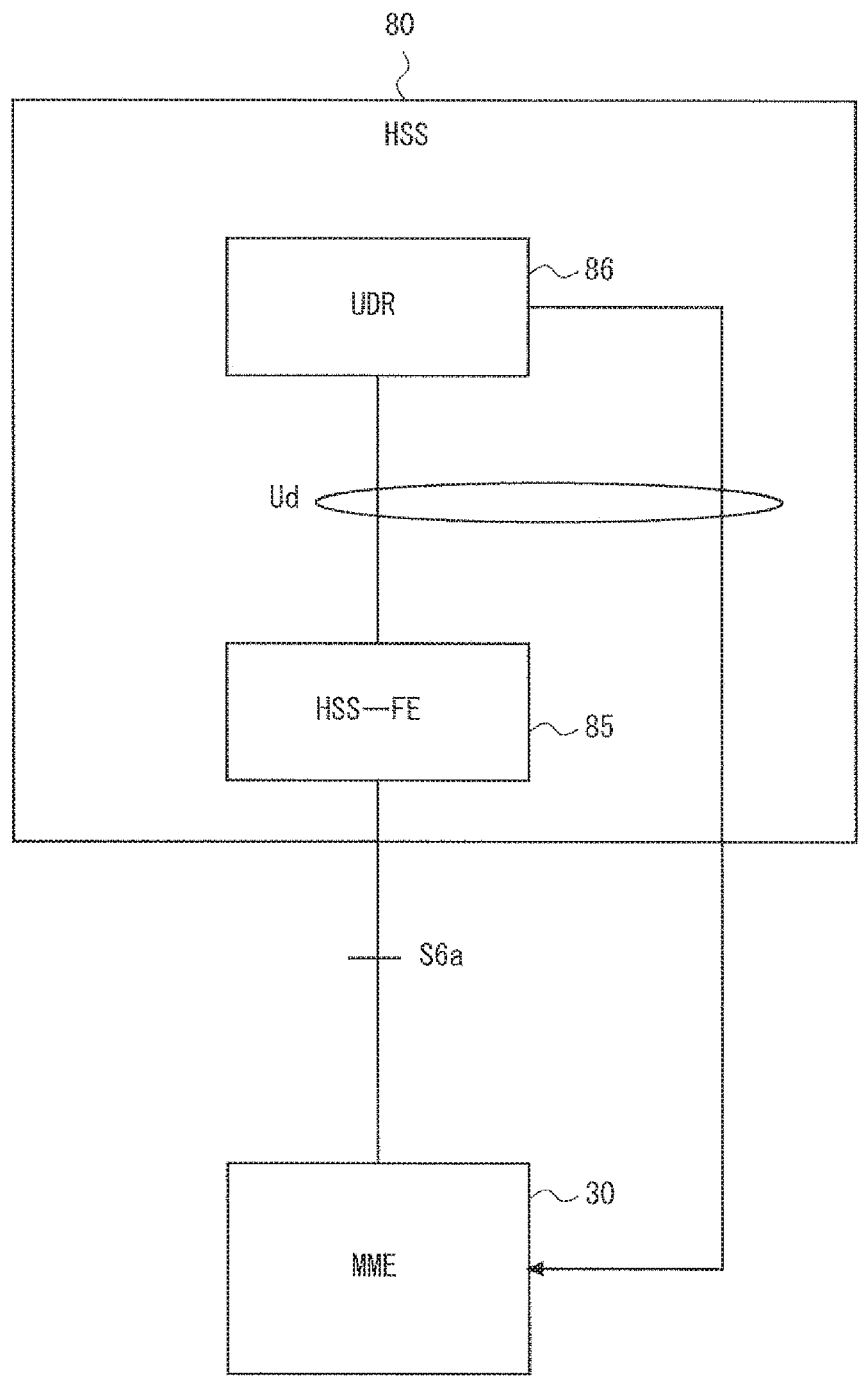
FIG. 34 illustrates an interface relating to the HSS according to the sixth embodiment.

FIG. 34 shows that the MME 30 is connected to an HSS-FE (Front End) 85 via the S6a interface, and connected to an UDR (User Data Repository) 86 via an Ud interface. Further, the HSS-FE 85 is connected to the UDR 86 via the Ud interface.

The UDR 86 retains the subscriber data of the UE. Further, the HSS-FE 85 is disposed between the MME 30 and the UDR 86, to relay communication between the MME 30 and the UDR 86. In this manner, the configuration of the HSS 80 may be separated into the UDR 86 being the data storage, and the HSS-FE 85 operating as the interface in communicating with the MME 30.

In the following, with reference to FIGS. 35 and 36, a description will be given of a processing flow of storing the context information created at an MME in the HSS 80 or the UDR 86.

Figure 19:
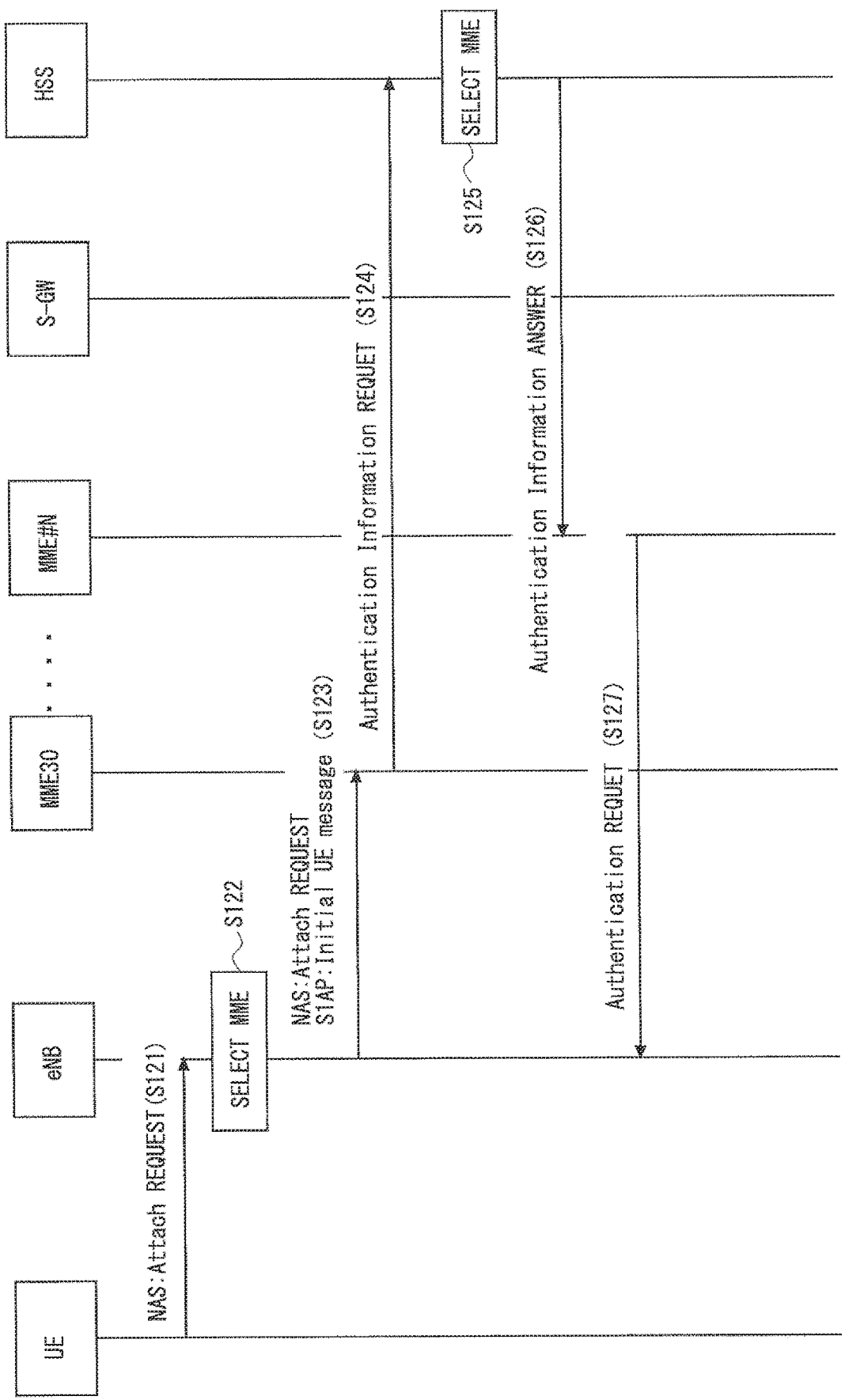
FIG. 19 shows call processing according to the second embodiment.

Firstly, similarly to step S122 in FIG. 19 and others, the eNB 70 selects an MME to be the destination of the NAS: Attach Request message (S271). Here, it is assumed that the eNB 70 selects the MME 30. Next, the eNB 70 transmits the NAS: Attach Request message to the selected MME 30 (S272).

Next, the MME 30 generates context information relating to the UE being the sender of the NAS: Attach Request message (S273). For example, the MME 30 generates the context information when the HSS 80 does not store therein the context information relating to the UE being the sender of the NAS: Attach Request message.

Next, in order to store the generated context information in the HSS 80 or the UDR 86 (in the following, referred to as the HSS 80 or the like), the MME 30 transmits a Context Put REQUEST message (S275). Next, the HSS 80 or the like stores, in its own memory or the like, the context information set on the Context Put REQUEST message (S275). Next, the HSS 80 or the like transmits a Context Put ANSWER message to the MME 30. Here, the HSS 80 or the like does not select an arbitrary MME belonging to the context sharing group, but instead transmits the Context Put ANSWER message to the MME that has transmitted the Context Put REQUEST message.

Next, in order to retrieve the authentication vector (AV) required in authenticating the UE, the MME 30 transmits an Authentication Information REQUEST message to the HSS 80 or the like (S277). Next, the HSS 80 or the like transmits, to the MME 30, an Authentication Information Answer message, setting thereon the authentication vector of the specified UE.

Next, in order to transmit the authentication vector received from the HSS 80 or the like to the HSS 80 or the like, the MME 30 transmits a Context Put REQUEST message to the HSS 80 or the like. The HSS 80 or the like updates the context information so that the context information reflects the authentication vector of the UE stored in step S275 (S280). Next, the HSS 80 transmits a Context Put ANSWER message to the MME 30 (S281).

Next, in order to authenticate the UE, the MME 30 transmits an Authentication REQUEST message to the UE via the eNB 70 (S282). Next, in order to transmit an Authentication RESPONSE message, similarly in step S271, the eNB 70 selects the MME to be the destination (S283). Here, it is assumed that the eNB 70 selects the MME #N belonging to the context sharing group A.

Next, the eNB 70 transmits the Authentication RESPONSE message to the selected MME #N (S284).

Figure 36:
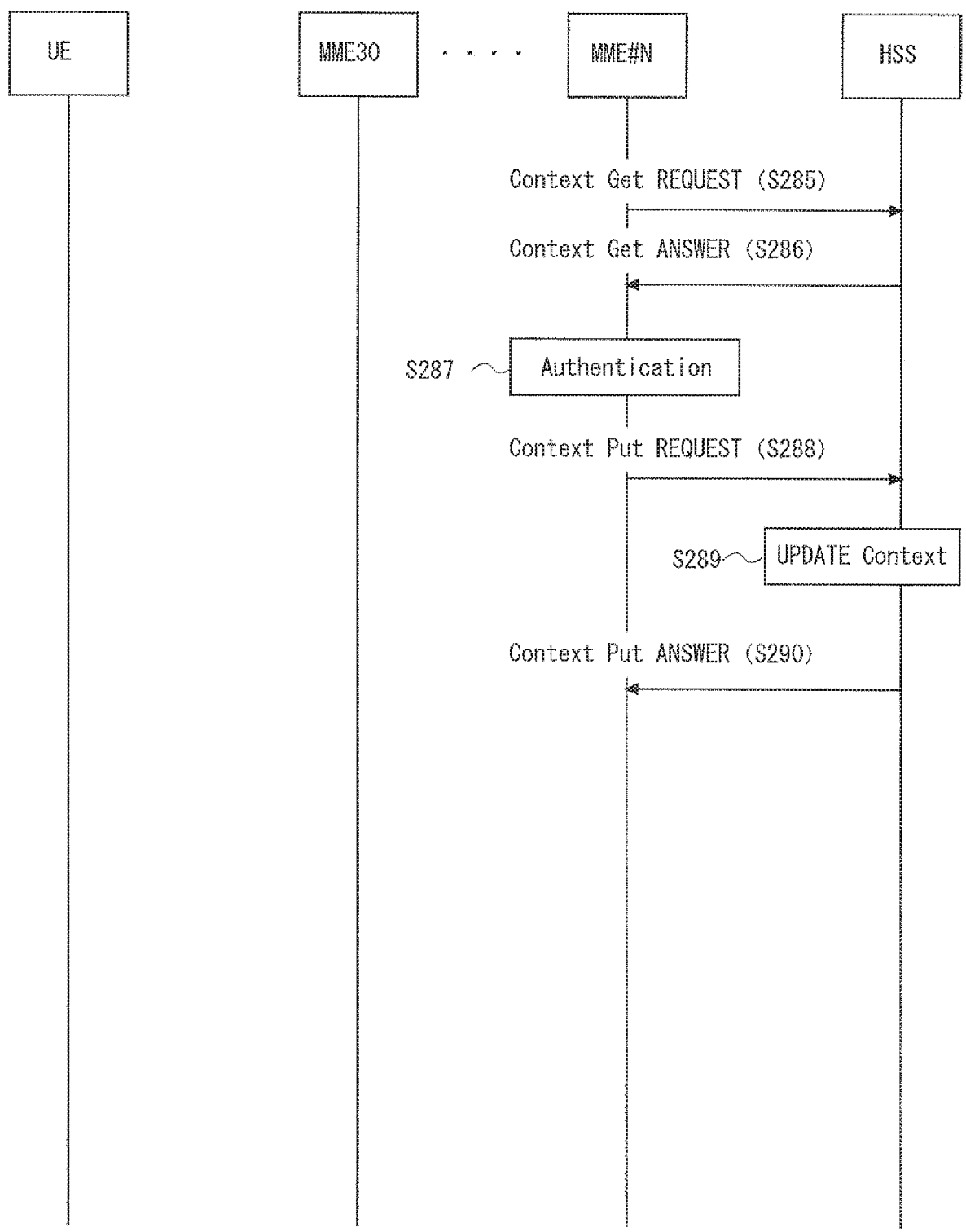
FIG. 36 shows a processing flow of storing the context information according to the sixth embodiment.

Next, with reference to FIG. 36, in order to retrieve context information relating to the UE, the MME #N transmits a Context Get REQUEST message to the HSS 80 or the like (S285). Next, the HSS 80 transmits a Context Get ANSWER message to the MME #N, setting thereon the context information of the specified UE (S286).

Next, the MME #N authenticates the UE (S287). Next, in order to store the context information reflecting the authentication in the HSS 80, the MME #N transmits a Context Put REQUEST message to the HSS 80, setting thereon the context information (S288). Next, the HSS 80 or the like updates the current context information using the context information set on the Context Put REQUEST message (S289). Next, the HSS 80 or the like transmits a Context Put ANSWER message to the MME #N (S290).

Figure 35:
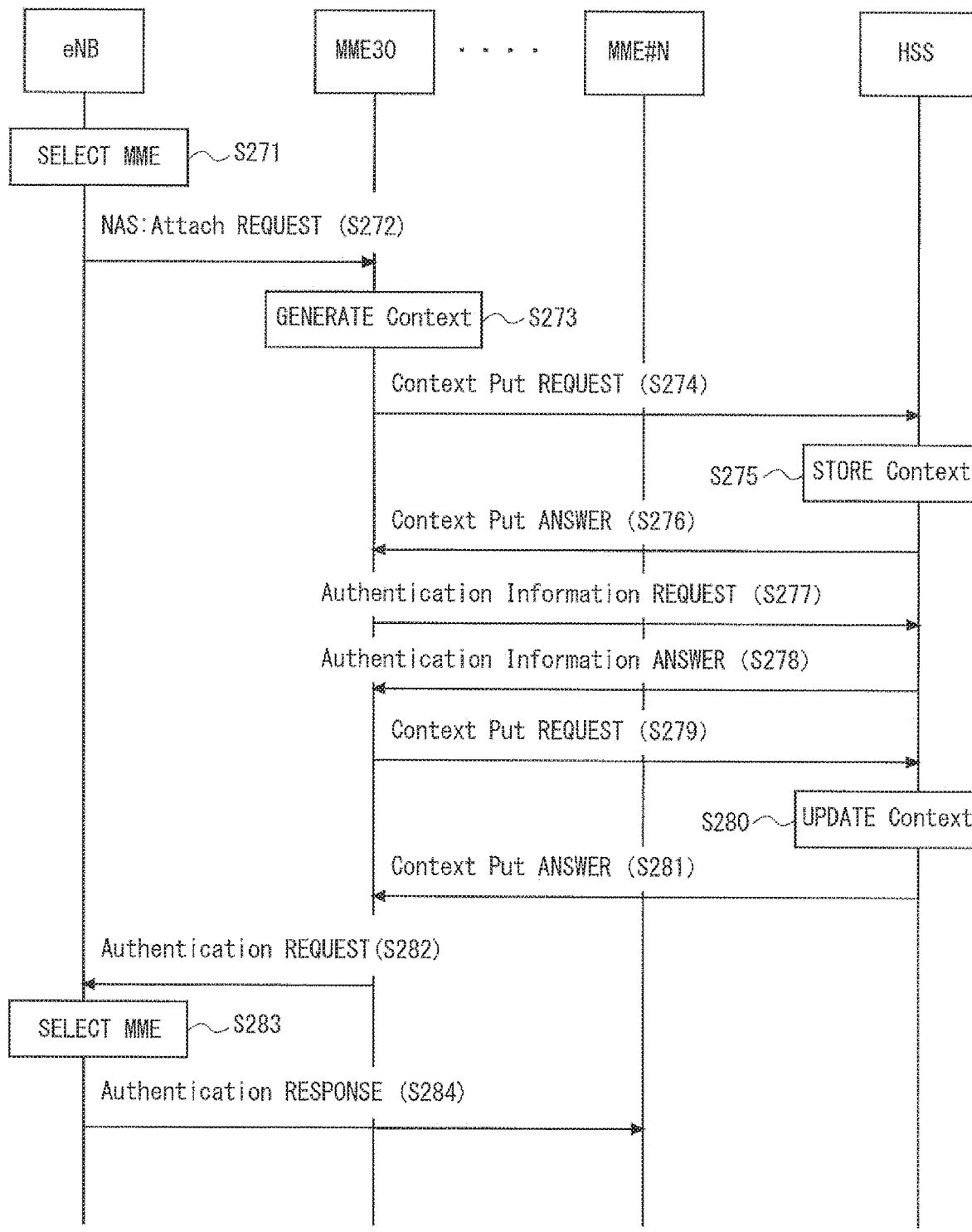
FIG. 35 shows a processing flow of storing context information according to the sixth embodiment.

Here, steps S277 to S281 in FIG. 35 show the operations of acquiring, from the HSS, an authentication vector required in authenticating the UE, and storing the authentication vector on the Context stored in the HSS 80. Accordingly, when the HSS 80 or the like stores the authentication vector on the stored context information, steps S277 to S281 can be dispensed with.

As has been described above, with the communication system according to the sixth embodiment of the present invention, the HSS can store the context information generated at the MME. Thus, by acquiring the context information from the HSS, a plurality of MMEs belonging to a context sharing group can each use the context information generated at other MME.

Seventh Embodiment

Figure 37:
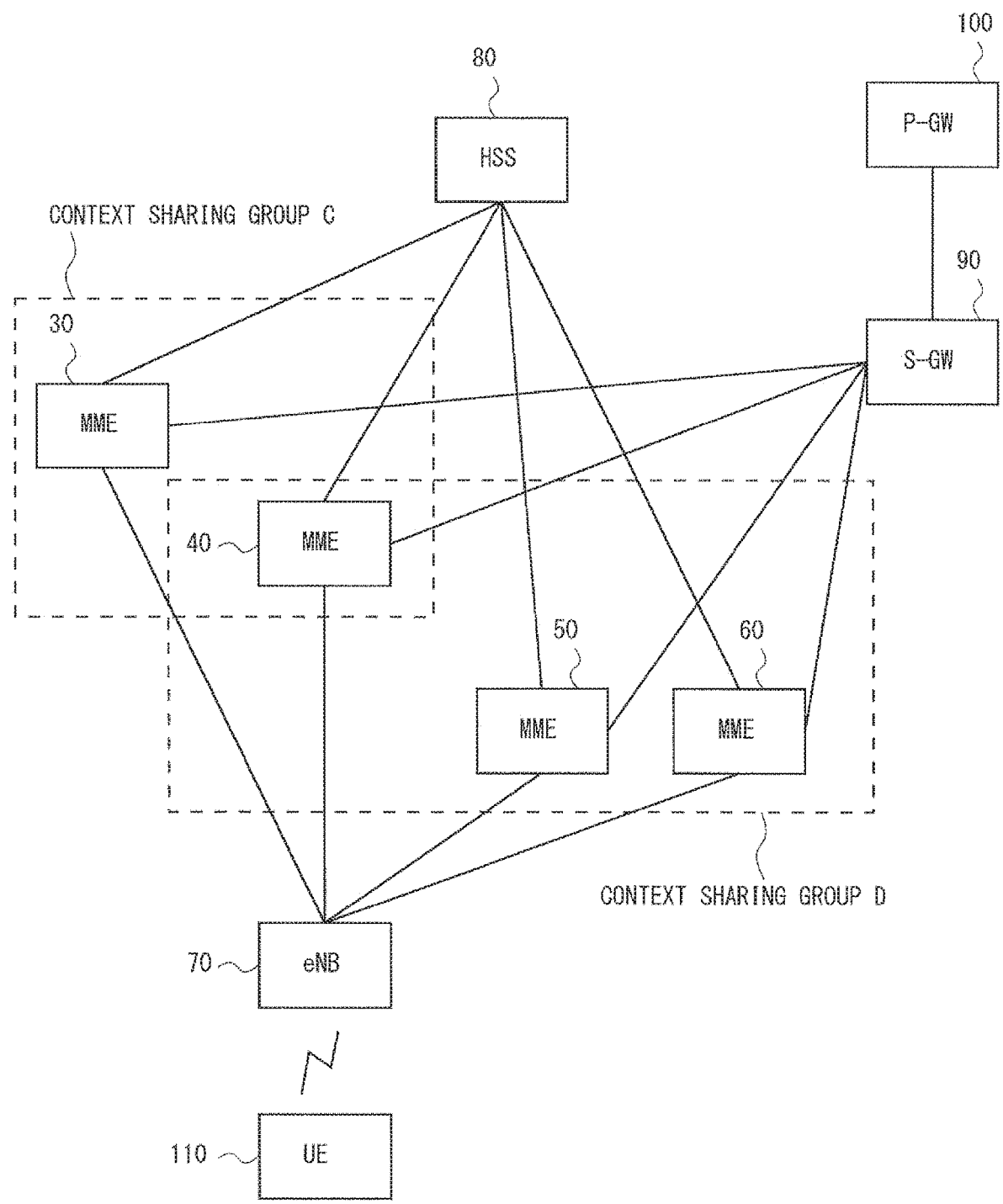
FIG. 37 shows a configuration of a communication system according to a seventh embodiment.

In the following, with reference to FIG. 37, a description will be given of an exemplary configuration of a communication system according to a seventh embodiment of the present invention. The communication system shown in FIG. 37 is different from the communication system shown in FIG. 2 in MMEs belonging to a context sharing group. In FIG. 37, a description will be mainly given of the difference from the communication system shown in FIG. 2.

In the communication system shown in FIG. 37, the MME 30 and the MME 40 belong to a context sharing group C. Further, the MME 40, the MME 50, and the MME 60 belong to a context sharing group D. That is, the MME 40 belongs to both the context sharing group C and the context sharing group D. In this manner, the MME may belong to a plurality of context sharing groups.

In the context sharing group configured as shown in FIG. 37, when the call processing in FIG. 19 is executed, if the GUMMEI specified by the GUTI set on the NAS: Attach Request message represents the MME 40, the eNB 70 cannot specify to which context sharing group the MME 40 belongs.

Accordingly, in such a case, information capable of specifying the context sharing group may be set on the GUMMEI. For example, an MMEC region of the GUMMEI may be subdivided into an MMEC+ context sharing group ID. Alternatively, in a message transmitted by an MME in response to the NAS: Attach Request message transmitted by the eNB 70 to the MME 40, a context sharing group may be specified.

As has been described above, by the communication system according to the seventh embodiment of the present invention allowing MMEs to belong to a plurality of context sharing groups, each of the MMEs belonging to a plurality of context sharing groups can also serve as an alternative apparatus in the context sharing groups.

Note that, the present invention is not limited to the embodiments described above, and can be modified as appropriate within a range not deviating from the spirit of the invention.

In the foregoing, while the present invention has been described with reference to the embodiments, the present invention is not limited by the foregoing description. The configurations and details of the present invention can be modified in various manners that can be understood by those skilled in the art within the scope of the invention.

This application is based upon and claims the benefit of priority from Japanese Patent Application No. 2015-049573, filed on Mar. 12, 2015, the disclosure of which is incorporated herein in its entirety by reference.

REFERENCE SIGNS LIST 10 communication control apparatus
11 communication control apparatus
12 communication control apparatus
20 node apparatus
30 MME
31 Diameter communication unit
32 S1AP communication unit
33 GTP-C communication unit
34 context sharing unit
35 context storing unit
36 MME call processing unit
40 MME
50 MME
60 MME
70 eNB
71 S1AP communication unit
72 S1AP call processing unit
73 RRC processing unit
74 radio processing unit
75 GTP-U communication unit
76 GTP-U processing unit
77 context storing unit
80 HSS
81 Diameter communication unit
82 subscriber information processing unit
83 subscriber information storing unit
85 HSS-FE
86 UDR
90 S-GW
91 GTP-C communication unit
92 GTP-U communication unit
93 GTP-C processing unit
94 context storing unit
95 GTP-U processing unit
100 P-GW
110 UE

The invention claimed is:

1. A communication apparatus for performing mobility management of a communication terminal, the communication apparatus comprising:
a transmitter configured to send identification information on the communication apparatus and information on a timer, wherein the timer is used for uninstalling the communication apparatus, to a node apparatus for relaying user data of the communication terminal; and
a processor configured to uninstall the communication apparatus based on the information on the timer.

2. The communication apparatus according to claim 1, wherein the timer indicates a remaining time information corresponding to the uninstallation of the communication apparatus.

3. The communication apparatus according to claim 1, wherein the timer indicates a remaining seconds corresponding to the uninstallation of the communication apparatus.

4. The communication apparatus according to claim 1, wherein the timer indicates a time point at which the begin the shutdown of the communication apparatus.

5. A node apparatus for relaying user data of a communication terminal, the node apparatus comprising:
   a receiver configured to receive, from a communication apparatus that performs mobility management of the communication terminal, identification information on the communication apparatus and information on a timer, wherein the timer is used for uninstalling the communication apparatus; and
   a processor configured to release a connection related to the communication apparatus based on the information on the timer.

6. The node apparatus according to claim 5, wherein the node apparatus performs wireless communication with the communication terminal.

7. The node apparatus according to claim 5, wherein the timer indicates a remaining time information corresponding to the uninstallation of the communication apparatus.

8. The node apparatus according to claim 5, wherein the timer indicates a remaining seconds corresponding to the uninstallation of the communication apparatus.

9. The node apparatus according to claim 5, wherein the timer indicates a time point at which the begin the uninstallation of the communication apparatus.

10. A method of a communication apparatus for performing mobility management of a communication terminal, the method comprising:
    sending identification information on the communication apparatus and information on a timer, wherein the timer is used for uninstalling the communication apparatus, to a node apparatus for relaying user data of the communication terminal; and
    uninstalling the communication apparatus based on the information on the timer.

11. The method according to claim 10, wherein the node apparatus performs wireless communication with the communication terminal.

12. The method according to claim 10, wherein the timer indicates a remaining time information corresponding to the uninstallation of the communication apparatus.

13. The method according to claim 10, wherein the timer indicates a remaining seconds corresponding to the uninstallation of the communication apparatus.

14. The method according to claim 10, wherein the timer indicates a time point at which the begin the uninstallation of the communication apparatus.

15. A method of a node apparatus for relaying user data of a communication terminal, the method comprising:
    receiving, from a communication apparatus for performing mobility management of the communication terminal, identification information on the communication apparatus and information on a timer, wherein the timer is used for uninstalling the communication apparatus; and
    releasing a connection related to the communication apparatus based on the information on the timer.

16. The method according to claim 15, wherein the node apparatus performs wireless communication with the communication terminal.

17. The method according to claim 15, wherein the timer indicates a remaining time information corresponding to the uninstallation of the communication apparatus.

18. The method according to claim 15, wherein the timer indicates a remaining seconds corresponding to the uninstallation of the communication apparatus.

19. The method according to claim 15, wherein the timer indicates a time point at which the begin the uninstallation of the communication apparatus.

* * * * *